United States Patent
Loewenstein et al.

(10) Patent No.: US 10,452,547 B2
(45) Date of Patent: Oct. 22, 2019

(54) FAULT-TOLERANT CACHE COHERENCE OVER A LOSSY NETWORK

(71) Applicant: Oracle International Corporation, Redwood Shores, CA (US)

(72) Inventors: Paul N. Loewenstein, Palo Alto, CA (US); Damien Walker, Santa Cruz, CA (US); Priyambada Mitra, San Jose, CA (US); Ali Vahidsafa, Palo Alto, CA (US); Matthew Cohen, Weehawken, NJ (US); Josephus Ebergen, San Francisco, CA (US); Andrew Brock, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/858,787

(22) Filed: Dec. 29, 2017

(65) Prior Publication Data
US 2019/0205252 A1 Jul. 4, 2019

(51) Int. Cl.
*G06F 12/00* (2006.01)
*G06F 12/0817* (2016.01)
(Continued)

(52) U.S. Cl.
CPC ...... *G06F 12/0824* (2013.01); *G06F 12/0813* (2013.01); *G06F 12/0828* (2013.01); *G06F 12/128* (2013.01); *G06F 2212/621* (2013.01)

(58) Field of Classification Search
CPC ............... G06F 12/0824; G06F 12/128; G06F 12/0813; G06F 12/0828; G06F 2212/621
See application file for complete search history.

(56) References Cited

U.S. PATENT DOCUMENTS

| 4,817,140 A | 3/1989 | Chandra |
| 5,133,053 A | 7/1992 | Johnson |

(Continued)

FOREIGN PATENT DOCUMENTS

| EP | 2423843 A | 2/2012 |
| WO | WO 02/191125 A2 | 3/2002 |

(Continued)

OTHER PUBLICATIONS

Radovic, Zoran, "Efficient Synchronization and Coherence for Nonuniform Communication Architectures", Department of Information Technology, Uppsala University, dated Sep. 2003, 170 pages.

(Continued)

*Primary Examiner* — Kalpit Parikh
(74) *Attorney, Agent, or Firm* — Hickman Palermo Becker Bingham LLP

(57) ABSTRACT

A cache coherence system manages both internode and intranode cache coherence in a cluster of nodes. Each node in the cluster of nodes is either a collection of processors running an intranode coherence protocol between themselves, or a single processor. A node comprises a plurality of coherence ordering units (COUs) that are hardware circuits configured to manage intranode coherence of caches within the node and/or internode coherence with caches on other nodes in the cluster. Each node contains one or more directories which tracks the state of cache line entries managed by the particular node. Each node may also contain one or more scoreboards for managing the status of ongoing transactions. The internode cache coherence protocol implemented in the COUs may be used to detect and resolve communications errors, such as dropped message packets between nodes, late message delivery at a node, or node failure. Additionally, a transport layer manages communi- (Continued)

cation between the nodes in the cluster, and can additionally be used to detect and resolve communications errors.

15 Claims, 37 Drawing Sheets

(51) Int. Cl.
G06F 12/128 (2016.01)
G06F 12/0813 (2016.01)

(56) References Cited

U.S. PATENT DOCUMENTS

| | | | |
|---|---|---|---|
| 5,167,035 A * | 11/1992 | Mann | H04L 29/00 370/250 |
| 5,522,045 A | 5/1996 | Sandberg | |
| 5,561,799 A | 10/1996 | Khalidi | |
| 5,684,977 A | 11/1997 | Van Loo | |
| 5,878,268 A * | 3/1999 | Hagersten | G06F 12/0813 711/E12.025 |
| 6,148,377 A | 11/2000 | Carter et al. | |
| 6,151,688 A | 11/2000 | Wipfel | |
| 6,175,566 B1 | 1/2001 | Hahn | |
| 6,230,240 B1 | 5/2001 | Shrader | |
| 6,292,705 B1 | 9/2001 | Wang | |
| 6,295,571 B1 | 9/2001 | Scardamalia | |
| 6,757,790 B2 | 6/2004 | Chalmer | |
| 7,197,647 B1 | 3/2007 | Van Essen | |
| 7,218,643 B1 | 5/2007 | Saito | |
| 7,664,938 B1 | 2/2010 | Tripathi | |
| 8,255,922 B1 | 8/2012 | Fresko | |
| 8,504,791 B2 | 8/2013 | Cheriton | |
| 8,732,386 B2 | 5/2014 | O'Krafka | |
| 9,052,936 B1 | 6/2015 | Aron | |
| 9,083,614 B2 | 7/2015 | Falco | |
| 2002/0191599 A1 | 12/2002 | Parthasarathy | |
| 2003/0105914 A1 | 6/2003 | Dearth | |
| 2004/0064653 A1 | 4/2004 | Gharachorloo | |
| 2006/0095690 A1 | 5/2006 | Craddock | |
| 2006/0098649 A1 | 5/2006 | Shay | |
| 2007/0260821 A1 | 11/2007 | Zeffer | |
| 2008/0010417 A1 | 1/2008 | Zeffer | |
| 2008/0065835 A1 | 3/2008 | Iacobovici | |
| 2009/0037571 A1 | 2/2009 | Bozak | |
| 2009/0240664 A1 | 9/2009 | Dinker et al. | |
| 2009/0240869 A1 | 9/2009 | O'Krafka et al. | |
| 2010/0030796 A1 | 2/2010 | Netz et al. | |
| 2012/0011398 A1 | 1/2012 | Eckhardt | |
| 2013/0013843 A1 | 1/2013 | Radovic et al. | |
| 2013/0036332 A1 | 2/2013 | Gove et al. | |
| 2013/0191330 A1 | 7/2013 | Aronovich | |
| 2013/0232344 A1 | 9/2013 | Johnson | |
| 2014/0095651 A1 | 4/2014 | Kapil et al. | |
| 2014/0095805 A1 | 4/2014 | Kapil et al. | |
| 2014/0095810 A1 | 4/2014 | Loewenstein et al. | |
| 2014/0096145 A1 | 4/2014 | Aingaran et al. | |
| 2014/0115283 A1 | 4/2014 | Radovic | |
| 2014/0181454 A1 | 6/2014 | Manula | |
| 2014/0229440 A1 | 8/2014 | Venkatesh | |
| 2014/0279894 A1 | 9/2014 | Loewenstein et al. | |
| 2015/0227414 A1 | 8/2015 | Varma | |
| 2015/0278103 A1 | 10/2015 | Radovic et al. | |

FOREIGN PATENT DOCUMENTS

| | | |
|---|---|---|
| WO | WO 02/078254 | 10/2002 |
| WO | WO 2010/039895 A2 | 4/2010 |

OTHER PUBLICATIONS

Karlsson, Martin, "Cache Memory Design Trade-Offs for Current and Emerging Workloads", Department of Information Technology, Uppsala University, dated Sep. 2003, 82 pages.

Wallin, Dan, "Exploiting Data Locality in Adaptive Architectures", Department of Information Technology, Uppsala University, data Sep. 2003, 122 pages.

Grenholm et al., "Latency-hiding Optimizations of the DSZOOM Instrumentation System" Department of Information Technology, Uppsala University, dated May 2003, 23 pages.

Walin et al., "Bundling: Reducing the Overhead Multiprocessor Prefetchers" Department of Information Technology, Uppsala University, dated Aug. 2003, 12 pages.

Walin et al., "Cache Memory Behavior of Advanced PDE Solvers", Department of Information Technology, Uppsala University, dated Aug. 2003, 9 pages.

Spjuth et al., "The Elbow Cache: A Power-Efficient Alternative to Highly Associative Caches", Department of Information Technology, Uppsala University, dated Sep. 2003, 9 pages.

Zeffer, et al., "Evaluation, Implementation and Performance of Write Permission Caching in the DSZOOM System", Technical report 2004-005, Department of Information Technology, Uppsala University, dated Feb. 2004., 23 pages.

Spjuth et al., "Low-Power and Conflict Tolerant Cache Design", Technical report 2004-024, Department of Information Technology, Uppsala University, dated May 2004, 10 pages.

Selen, Thorild, "Reorganisation in the skewed-associative TLB", Technical report 2004-027, Department of Information Technology, Uppsala University, dated Sep. 2004. (Master's thesis), 68 pages.

Zeffer, Hakan, "Hardware-Software Tradeoffs in Shared-Memory Implementations", PhD thesis, Department of Information Technology, Uppsala University, dated Nov. 2005, 106 pages.

Zeffer, Hakan, "Adaptive Coherence Batching for Trap-Based Memory Architectures", Licentiate Thesis 2005-002, Department of Information Technology, Uppsala University, dated May 2005, 11 pages.

Albertsson et al., "Using Complete System Simulation for Temporal Debugging of General Purpose Operating Systems and Workloads", In Proceedings of the 8th International Symposium on Modeling, Analysis and Simulation of Computer and Telecommunication Systems (MASCOTS 2000), San Francisco, California, USA, dated Aug. 2000, 8 pages.

Albertsson et al., "Simulation-Based Temporal Debugging of Inux", In Proceedings of the 2nd Real-Time Linux Workshop, Lake Buena Vista, Florida, USA, dated Nov. 2000, 7 pages.

Albertsson, Lars, "Simulation-Based Debugging of Soft Real Time Applications", In Proceedings of the Real-Time Application Symposium, IEEE Computer Society, IEEE Computer Society Press, dated May 2001, 2 pages.

Berg et al., "SIP: Performance Tuning Through Source Code Interdependence", In Proceedings of the 8th International Euro-Par Conference (Euro-Par 2002), Paderborn, Germany, dated Aug. 2002, 10 pages.

Berg et al., StatCache: A Probabilistic Approach to Efficient and Accurate Data Locality Analysis, Technical report 2003-058, Department of Information Technology, Uppsala University, dated Nov. 2003, 8 pages.

Berg et al., "Fast Data-Locality Profiling of Native Execution", In Proceedings of ACM SIGMETRICS 2005, Banff, Canada, dated Jun. 2005, 12 pages.

Berg et al., "A Statistical Multiprocessor Cache Model", On Proceedings of the 2006 IEEE International Symposium on Performance Analysis of Systems and Software (ISPASS-2006), Austin, Texas, USA, dated Mar. 2006, 11 pages.

Berg et al., "Low Overhead Spatial and Temporal Data Locality Analysis", Department of Information Technology, Uppsala University, dated Nov. 2003, 30 pages.

Spjuth et al., "Skewed Caches from a Low-Powered Perspective", On Proceedings of Computing Frontiers, Ischia, Italy, dated May 2005, 9 pages.

Zeffer, Hakan, "Towards Low-Complexity Scalable Shared-Memory Architectures", Thesis Department of Information Technology, Uppsala University, dated Oct. 2006. ISBN 91-554-6647-8., 50 pages.

Lof, Henrik, "Iterative and Adaptive PDE Solvers for Shared Memory Architectures", Thesis Department of Information Technology, Uppsala University, dated Oct. 2006. SBN 91-554-6648-6, 58 pages.

(56) References Cited

OTHER PUBLICATIONS

Wallin, Dan, "Methods for Creating and Exploiting Data Locality", Thesis Department of Information Technology, Uppsala University, dated May 2006. ISBN 91-554-6555-2, 38 pages.
Berg, Erik, "Efficient and Flexible Characterization of Data Locality through Native Execution Sampling", Department of Information Technology, Uppsala University, dated Nov. 2005, 36 pages.
Karlsson, Martin, "Memory System Design for Chip-Multiprocessors", Thesis Department of Information Technology, Uppsala University, dated Jan. 2006. ISBN 91-554-6429-7, 34 pages.
Hagersten et al., "Simulating the Data Diffusion Machine", In Proceedings of the Parallel Architecture and Languages Europe (PARLE=EUROPAR), Springer-Verlag, dated Jun. 1993. (Best Presentation Award.), 18 pages.
Hagersten et al., "Simple COMA Node Implementations" In Proceedings of the Hawaii International Conference on System Sciences (HICSS), dated Jan. 1994. (The original Simple COMA paper.), 12 pages.
Hagersten et al., "Wildfire: A Scalable Path for SMPs", In Proceedings of the 5th International Symposium on High-Performance Computer Architecture (HPCA-5), pp. 172-181, Orlando, Florida, USA, dated Jan. 1999, 10 pages.
Hagersten et al., "Parallel Computing in the Commercial Marketplace Research and Innovation at Work", Scanning the DSM Technology in Proceedings of the IEEE, dated Mar. 1999, 12 pages.
Holmgren et al., "Performance of High-Accuracy PDE Solvers on a Self-Optimizing NUMA Architecture", UPTEC F-01-017, ISSN 1401-5757, School of Engineering, Uppsala University, Sweden, dated Feb. 2001, 9 pages.
Holmgren et al., "Performance of High-Accuracy PDE Solvers on a Self-Optimizing NUMA Architecture", In Proceedings of the 7th International Euro-Par Conference (Euro-Par 2001), Manchester, UK, dated Aug. 2001, 15 pages.
UU/IT/UPSALA Architecture Research Team. "Department of Technology, Publications", http://www.it.uu.se/research/group/uart/publications, last accessed Apr. 2, 2013, 9 pages.
UU/IT/DSZOOM Home Page. "Department of Technology, Low Latency Distributed Software-Based Shared Memory, DSZOOM", http://www.it.uu.se/research/group/uart/projects/dszoom, last accessed Apr. 2, 2013, 4 pages.
Landin et al., Race-Free Interconnection Networks and Multiprocessor Consistency, In Proceedings of the 18th International Symposium on Computer Architecture (ISDA), vol. 19, No. 3, pp. 106-115, Toronto, Canada, dated May 1991, 12 pages.
Petoumenos et al., STATSHARE: A Statistical Model for Managing Cache Sharing Via Decay, In 2006th Workshop on Modeling, Benchmarking and Simulation held in conjunction: with the 33rd Annual International Symposium on Computer Architecture, Boston, MA USA, dated Jun. 2006, 10 pages.
Loewenstein, U.S. Appl. No. 13/828,555, filed Mar. 14, 2013, Final Office Action, dated Jan. 31, 2018.
Loewenstein, U.S. Appl. No. 13/828,555, filed Mar. 14, 2013, Notice of Allowance, dated Jul. 23, 2018.
U.S. Appl. No. 13/828,555, filed Mar. 14, 2013, Final Office Action, dated Jun. 30, 2016.
Loewenstein, U.S. Appl. No. 13/828,555, filed Mar. 14, 2013, Final Office Action, dated Feb. 9, 2017.
Loewenstein, U.S. Appl. No. 13/828,555, filed Mar. 14, 2013, Interview Summary, dated Apr. 18, 2017.
Loewenstein, U.S. Appl. No. 13/828,555, filed Mar. 14, 2013, Office Action, dated Sep. 8, 2017.
Loewenstein, U.S. Appl. No. 13/828,983, filed Mar. 14, 2013, Notice of Allowance, dated Jan. 27, 2017.
Radovic, U.S. Appl. No. 14/530,354, filed Oct. 31, 2014, Notice of Allowance, dated Oct. 6, 2017.
Radovic, U.S. Appl. No. 14/530,354, filed Oct. 31, 2014, Office Action, dated Mar. 20, 2017.
Radovic, U.S. Appl. No. 14/530,354, filed Oct. 31, 2014, Interview Summary, dated Sep. 21, 2017.
Loewenstein, U.S. Appl. No. 13/828,555, filed Mar. 14, 2013, Adviosry Action, dated Apr. 21, 2017.
Radovic, U.S. Appl. No. 14/530,354, filed Oct. 31, 2014, Interview Summary, dated Dec. 12, 2016.
U.S. Appl. No. 13/828,555, filed Mar. 14, 2013, Office Action, dated Feb. 4, 2016.
U.S. Appl. No. 13/828,555, filed Mar. 14, 2013, Interview Summary, dated Apr. 28, 2016.
U.S. Appl. No. 13/828,983, filed Mar. 14, 2013, Advisory Action, dated Jul. 22, 2016.
U.S. Appl. No. 13/828,983, filed Mar. 14, 2013, Final Office Action, dated May 16, 2016.
U.S. Appl. No. 13/828,983, filed Mar. 14, 2013, Interview Summary, dated Jun. 23, 2016.
U.S. Appl. No. 13/828,983, filed Mar. 14, 2013, Notice of Allowance, dated Oct. 11, 2016.
U.S. Appl. No. 13/828,983, filed Mar. 14, 2013, Office Action, dated Oct. 1, 2015.
U.S. Appl. No. 14/530,354, filed Oct. 31, 2014, Office Action, dated Sep. 19, 2016.
Radovic, U.S. Appl. No. 14/530,354, filed Oct. 31, 2017, Final Office Action, dated Aug. 18, 2017.
Zeffer et al., "Flexibility Implies Performance", Appears in Proceedings of the 20th IEEE International Parallel & Distributed Processing Symposium (IPDPS 2006), Rhodes Island, Greece, dated Apr. 2006, 14 pages.
Hagersten, Erik, "Toward Scalable Cache Only Memory Architectures", Department of Telecommunications and Computer Systems, The Royal Institute of Technology, Stockholm, Sweden, dated Oct. 1992, 274 pages.
Karlsson et al., "Timestamp-based Selective Cache Allocation", In High Performance Memory Systems, edited by H. Hadimiouglu, D. Kaeli, J. Kuskin, A. Nanda, and J. Torrellas, Springer-Verlag, 2003. Also published in Proceedings of the Workshop on Memory Performance Issues (WMPI 2001), held in conjunction with the 28th International Symposium on Computer Architecture (ISCA28).
Karlsson et al., "Exploring Processor Design Options for Java-Based Middleware", In Proceedings of the 2005 International Conference on Parallel Processing (ICPP-05), Oslo, Norway, dated Jun. 2005, 10 pages.
Berg, Erik,"Methods for Run Time Analysis of Data Locality" Department of Information Technology, Uppsala University, dated Dec. 2003, 84 pages.
Lof et al:., "THROOM—Supporting POSIX Multithreaded Binaries on a Cluster", In Proceedings of the 9th International Euro-Par Conference (Euro-Par 2003), Klagenfurt, Austria, dated Aug. 2003, 10 pages.
Magnusson et al., "Queue Locks on Cache Coherent Multiprocessors", In Proceedings of the Hawaii International Conference on System Sciences (HICSS), dated Jan. 1994. (The original Simple COMA paper.), 7 pages.
Wallin et al., "Multigrid and Gauss-Seidel Smoothers Revisited: Parallelization on Chip Multiprocessors", In Proc. 20th ACM International Conference on Supercomputing, ACM Press, dated 2006, 11 pages.
Petoumemenos et al., "Modeling Cache Sharing on Chip Multiprocessor Architectures", In Proceedings of the 2006 IEEE International Symposium of Workload Characterization: San Jose, California, USA, dated 2006, 12 pages.
Radovic, Zoran, "DZOOM-Low Latency Software Based Shared Memory", UPTEC F-00-093, ISSN 1401-5757, School of Engineering, Uppsala University, Sweden, dated Dec. 2000, 51 pages.
Radovic et al., "Implementing Low Latency Distributed Software-Based Shared Memory", In Proceedings of the Workshop on Memory Performance Issues (WMPI 2001), held in conjunction with the 28th International Symposium on Computer Architecture (ISCA28), Göteborg, Sweden, dated Jun. 2001, 12 pages.
Radovic et al., "Removing the Overhead from Software-Based Shared Memory", In Proceedings of Supercomputing 2001 (SC2001), Denver, Colorado, USA, dated Nov. 2001, 13 pages.
Radovic et al., "RH Lock: A Scalable Hierarchical Spin Lock", In Proceedings of the 2nd Annual Workshop on Memory Performance Issues (WMPI 2002), held in conjunction with the 29th International

(56) References Cited

OTHER PUBLICATIONS

Symposium on Computer Architecture (ISCA29), Anchorage, Alaska, USA, dated May 2002, 10 pages.

Radovic et al., "Efficient Synchronization for Nonuniform Communication Architecture", In Proceedings of Supercomputing 2002 (SC2002), Baltimore, Maryland, USA, dated Nov. 2002, 13 pages.

Radovic et al., "Hierarchical Backoff Locks for Nonuniform Communication Architecture" In Proceedings of the Ninth International Symposium on High Performance Computer Architecture (HPCA-9), Anaheim, California, USA, dated Feb. 2003, 12 pages.

Singhal et al., "Gigaplane: A High Performance Bus for Large SMPs", In Proceedings of the IEEE Hot Interconnect IV, pp. 41-52, Stanford University, dated Aug. 1996, 12 pages.

Spjuth, Mathias, "Refinement and Evaluation of the Elbow Cache", UPTEC F-02-033, ISSN 1401-5757, School of Engineering, Uppsala University, Sweden, dated Apr. 2002, 12 pages.

Berg et al., "StatCache: A Probabilistic Approach to Efficient and Accurate Data Locality Analysis", In Proceedings of the 2004 IEEE International Symposium on Performance Analysis of Systems and Software (ISPASS-2004), Austin, Texas, USA, dated Mar. 2004, 26 pages.

Wallin, Dan, "Performance of a High-Accuracy PDE Solver on a Self-Optimizing NUMA Architecture", In Journal of Parallel Algorithms and Applications, vol. 17, No. 4, dated 2003, 29 pages.

Wallin et al., "Miss Penalty Reduction Using Bundled Capacity Prefectching in Multiprocessors", In Proceedings of the 17th International Parallel and Distributed Processing Symposium (IPDPS 2003), Nice, France, dated Apr. 2003, 9 pages.

Wallin et al., "Cache Memory Behavior of Advanced PDE Solvers", In Proceedings of Parallel Computing 2003 (ParCo2003), Dresden, Germany, dated Sep. 2003, 6 pages.

Wallin et al., "Bundling: Reducing the Overhead of Multiprocessor Prefetchers", Technical Report 2003-037, Department of Information Technology, Uppsala University, dated Aug. 2003, 10 pages.

Walin et al., "Vasa: A Simulator Infrastructure With Adjustable Fidelity", In Proceedings of the 17th IASTED International Conference on Parallel and Distributed Computing and Systems (PDCS 2005), Phoenix, Arizona, USA, dated Nov. 2005, 10 Pages.

Zeffer et al., "Exploiting Spatial Store Locality Through Permission Caching in Software DSMs", In Proceedings of the 10th International Euro-Par Conference (Euro-Par 2004), Pisa, Italy, dated Aug. 2004, 10 pages.

Zeffer et al., "Exploiting Locality: A Flexible DSM Approach", In Proceedings of the 20th IEEE International Parallel & Distributed Processing Symposium (IPDPS 2006), Rhodes Island, Greece, dated Apr. 2006, 10 pages.

Zeffer et al., "A Case for Low-Complexity Multi-CMP Architectures", Technical report 2006-031, Department of Information Technology, Uppsala University, dated Jun. 2006, 14 pages.

Zeffer et al., A Trap-Based Memory Architecture, In Proceedings of the 20th ACM International Conference on Supercomputing (ICS 2006), Cairns, Queensland, Australia, dated Jun. 2006, 10 pages.

Karlsson et al., "Memory System Behavior of Java-Based Middleware" In Proceedings of the Ninth International Symposium on High Performance Computer Architecture (HPCA-9), Anaheim, California, USA, dated Feb. 2003, 12 pages.

Li et al., "Memory Coherence in Shared Virtual Memory Systems", ACM Transactions on Computer Systems, vol. 7, No. 4, dated Nov. 1989, 39 pages.

Brewer et al., Remote Queues: Exposing Message Queues for Optimization and Atomicity, dated 1995 ACM, 12 pages.

Cockshott et al., "High-Performance Operations Using a Compressed Database Architecture" dated Aug. 12, 1998, 14 pages.

Franke et al., "Introduction to the wire-speed processor and architecture" IBM J. Res & Dev. vol. 54 No. 1 Paper 3, dated Jan. 2010, 12 pages.

Gao et al., "Application-Transparent Checkpoint/Restart for MPI Programs over InfiniBand", dated 2006, 8 pages.

Hardavellas et al., "Software Cache Coherence with Memory Scaling", dated Apr. 16, 1998, 2 pages.

Kent, Christopher A., "Cache Coherence in Distributed Systems", dated Dec. 1987, Digital Western Research Laboratory, dated 1986, 90 pages.

Agarwal et al., "An Evaluation of Directory Schemes for Cache Cohrerence", Proceedings of the 15th Annual International Symposiumn on Computer Architecture, dated May 1988, 10 pages.

Lenoski et al., "The Directory-Based Cache Coherence Protocol for the DASH Multiprocessor", IEEE, dated 1990, 12 pages.

Zhang, Long, "Attribute Based Encryption Made Practical" A Thesis Submitted in Partial Fulfillment of the Requirements for the Degree of Master of Science, dated Apr. 2012, 62 pages.

Ming et al., "An Efficient Attribute Based Encryption Scheme with Revocation forOutsourced Data Sharing Control",2011 Internat. Conference, Oct. 21, 2011, pp. 516-520.

Von Eicken et al., Active Messages: A Mechanism for Integrated Communication and Computation, dated 1992, ACM, 12 pages.

Wang et al., "Hierarchical Attribute-Based Encryption and Scalable User Revocation for Sharing Data in Cloud Servers", Computeres & Security 2011, vol. 30, No. 5, May 14, 2011, pp. 320-331.

Wang et al., HyperSafe: A Lightweight Approach to Provide Lifetime hypervisor Control-Flow Integrity IEEE, dated 2010, 16 pages.

Yu et al., "Attribute Based Data Sharing with Attribute Revocation", Proceedings of the 5th ACM Symposium, Apr. 13, 2010, pp. 261-271, New York, USA.

Zeffer et al., "TMA: A Trap-Based Memory Architecture", in ICS, dated 2006 Proceedings of the 20th Annual International Conference of Supercomputing, pp. 259-268.

Lee et al., "A Comprehensive Framework for Enhancing Security in InfiniBand Architecture", IEEE, vol. 18 No. 10, Oct. 2007, 14 pages.

Zoran Radovic, "Efficient Synchronization Coherence for Nonuniform Communication" Uppsala University, dated Sep. 2003, 170 Pages.

Lof et al., "THROOM, Running POSIX Multithread Binaries on a Cluster", Technical Report 2003-026, Department of Information Technology, Uppsala University, Dated Apr. 2003, 11 pages.

Grenholm et al., "Latency-Hiding and Optimizations of the DSZOOM Instrumentation System", Technical Report 2003-029, Department of Information Technology, Uppsala University, dated May 2003, 23 pages.

Zeffer et al., "Evaluation, Implementation and Performance of Write Permission Caching in the DSZOOM System", Technical report 2004-005, Department of Information Technology, Uppsala University, Feb. 2004, 23 pages.

Zeffer, Hakan, "Hardware-Software Tradeoffs in Shared-Memory Implementations", Licentiate Thesis 2005-002, Department of Information Technology, Uppsala University, May 2005, 106 pages.

Zeffer et al., "Flexibility Implies Performance", Technical report 2005-013, Department of Information Technology, Uppsala University, dated Apr. 2005, 14 pages.

Zeffer et al., "TMA: A Trap-Based Memory Architecture", Technical report 2005-015, Department of Information Technology, Uppsala University, dated May 2005, 11 pages.

Ekstrom, Niklas, "Improving DSZOOM's Run Time System", Master's thesis, UPTEC F03 104, ISSN 1401-5757, School of Engineering, Uppsala University, Sweden, dated Jan. 2004, 32 pages.

Radovic, Zoran, "Software Techniques for Distributed Shared Memory", Doctoral Thesis, Department of Information Technology, Uppsala University, dated Nov. 2005, 133 pages.

Grenholm, Oskar, "Simple and Efficient Instrumentation for the DSZOOM System", UPTEC F-02-096, ISSN 1401-5757, School of Engineering, Uppsala University, Sweden, dated Dec. 2002, 46 pages.

Lof et al., "THROOM—Supporting POSIX Multithread Binaries on a Cluster", In Proceedings of the 9th International Euro-Par Conference (Euro-Par 2003), Klagenfurt, Austria, dated Aug. 2003, 10 pages.

Radovic, Zoran, "DSZOOM—Low Latency Software Based Shared Memory", Technical Report 2001:03, Parallel and Scientific Computing Institute (PSCI), Sweden, Apr. 2001, 24 pages.

(56) References Cited

OTHER PUBLICATIONS

Radovic, Zoran, "DSZOOM—Low Latency Software Based Shared Memory", UPTEC F-00-093, ISSN 1401-5757, School of Engineering, Uppsala University, Sweden, dated Dec. 2000, 51 pages.

Radovic et al., "Implementing Low Latency Distributed Software-Based Shared Memory", In Proceedings of the Workshop on Memory Performance Issues (WMPI 2001), held in conjunction with the 28th International Symposium on Computer Architecture (ISCA28), Göteborg, Sweden, Jun. 2001.

Radovic et al., "Removing the Overhead for Software-Based Shared Memory", In Proceedings of Supercomputing 2001, Denver, Colorado, USA, dated Nov. 2001, 13 pages.

Zeffer et al., "Exploiting Spatial Locality Through Permission Caching in Software DSMs", In Proceedings of the 10th International Euro-Par Conference (Euro-Par 2004), Pisa, Italy, dated Aug. 2004, 10 pages.

* cited by examiner

Request To Share to Home with exclusive copy

Request To Share with another Importer sharing

CMT handling, race with incoming CPB

Lost RTS message and retry

Delayed RTS message and retry

Lost Data message and RTS retry

Lost RTS message and retry

Lost Data message and RTS retry

Lost Data message for CPB

Lost Data message during secondary CPB

| In | Cur. state | | Out | Next state | |
|---|---|---|---|---|---|
| | FSM | Cache | | FSM | Cache |
| - | Idle | I | RTS *(3)* | rts1 | - |
| Data | rts1 | - | Ack | Idle | S *(1)* |
| Replay | | | RTS *(2)* | rts1 | - |
| Retry | | | RTS *(3)* | | |
| Abandon | | | - | Idle | S/P |

Importer handling of RTS request

*Notes*

1. Accept data.
2. RTS is sent with same sequence number as original request or last retry.
3. RTS is sent with new sequence number.

FIG. 5A

| In | Cur. state FSM | Cur. state Cache | Out | Next state FSM | Next state Cache |
|---|---|---|---|---|---|
| - | Idle | I | RTO *(3)* | rto1 | - |
| | | O,S | RTU | rto2 | - |
| Data | rto1 | | Ack | Idle | E *(1)* |
| Replay | | | RTO *(2)* | rto1 | - |
| Retry | | | RTO *(3)* | | |
| Abandon | | | - | Idle | E/P |
| Data | rto2 | | Ack | Idle | E *(1)* |
| Ack | | O | | | M |
| | | S | | | E |
| | | I | Ack, RTO | rto1 | - *(5)* |
| Nack | | O | - | Idle | M/P |
| | | S | | | E/P |
| | | I | | | I/P *(5)* |
| Replay | | | RTO | rto1 | - |
| | | O,S | RTU *(4)* | rto2 | |
| Retry | | I | RTO | rto1 | |
| | | O,S | RTU *(4)* | rto2 | |
| Abandon | | O | - | Idle | M/P |
| | | S,I | | | E/P |

Importer handling of RTO request

*Notes*

1. Accept Data.

2. RTO is sent with same sequence number as original request or last retry.

3. RTO is sent with new sequence number.

4. Alternatively send RTO and transition to rto1 (causes unnecessary data transfer).

5. This case indicates that data was invalidated before RTU could be processed and a stale RTS corrupted the directory.

FIG. 5B

| In | Cur. state | | Out | Next state | |
| --- | --- | --- | --- | --- | --- |
| | FSM | Cache | | FSM | Cache |
| - | Idle | E,S,I | VCT *(2)* | vct1 | - |
| Ack | vct1 | - | - | Idle | - |
| Nack | | | | | I/T *(3)* |
| Replay | | | VCT *(1)* | vct1 | - |
| Retry | | | VCT *(2)* | | |
| Abandon | | | - | Idle | I/T *(3)* |

Importer handling of VCT request

*Notes*

1. VCT is sent with same sequence number as original request or last retry.

2. VCT is sent with new sequence number.

3. Because the threads that accessed the cache line cannot be identified when the cache line is victimized, a designated error-steering thread is interrupted.

*FIG. 5C*

| In | Current state | | | Out | Next state | | |
|---|---|---|---|---|---|---|---|
| | FSM | Cache | HF | | FSM | Cache | HF |
| - | Idle | - | - | WB *(2)* | wb1 | - | - |
| Ack | wb1 | - | - | - | Idle | - | - |
| Nack | | | | | | I/T *(3)* | |
| Replay | | | | WB *(1)* | wb1 | - | |
| Retry | | | | WB *(2)* | | | |
| Abandon | | | | - | Idle | I/T *(3)* | Closed |

Importer handling of WB request

*Notes*

1. WB is sent with same sequence number as original request or last retry.
2. WB is sent with new sequence number.
3. Because the threads that modified the cache line cannot be identified when the cache line is victimized, a designated error-steering thread is interrupted.

FIG. 5D

| In | Current state | | | Out | Next state | | |
|---|---|---|---|---|---|---|---|
| | FSM | Cache | HF | | FSM | Cache | HF |
| ~ | Idle | ~ | Open | CMT | cmt1 | ~ | ~ |
| | | | Closed | ~ | Idle | I/T (3) | |
| Pull | cmt1 | M | ~ | DataW | cmt2 | E | ~ |
| | | O | | | | S | |
| | | E,S,I | | Ack | cmt3 | ~ | |
| Ack | | ~ | | ~ | Idle | | |
| Nack | | | | | | I/T (3) | |
| Replay | | | | CMT (1) | cmt1 | ~ | |
| Retry | | | | CMT (2) | | | |
| Abandon | | M,O,E,S | | ~ | Idle | I/T (3) | Closed |
| | | I | | | | ~ | |
| Ack | cmt2 | ~ | ~ | ~ | Idle | ~ | ~ |
| Replay | | | | CMT (1) | cmt4 | | |
| Retry | | | | CMT (2) | | | |
| Abandon | | M,O,E,S | | ~ | Idle | I/T (3) | Closed |
| | | I | | | | ~ | |
| Ack | cmt3 | ~ | ~ | ~ | Idle | ~ | ~ |
| Retry | | | | CMT (2) | cmt1 | | |
| Abandon | | M,O,E,S | | ~ | Idle | I/T (3) | Closed |
| | | I | | | | ~ | |
| Pull | cmt4 | M | ~ | DataW | cmt2 | E | ~ |
| | | O | | | | S | |
| | | E,S | | | | ~ | |
| | | I | | Ack | cmt3 | | |
| Ack | | ~ | | ~ | Idle | | |
| Nack | | | | | | I/T (3) | |
| Replay | | | | CMT (1) | cmt4 | ~ | |
| Retry | | | | CMT (2) | | | |
| Abandon | | M,O,E,S | | ~ | Idle | I/T (3) | Closed |
| | | I | | | | ~ | |

Importer handling of CMT request

*Notes*

1. CMT is sent with same sequence number as original request or last retry.
2. CMT is sent with new sequence number.
3. The threads that modified the cache line up to the point of cleaning the cache line (upon receiving Pull in states cmt1 or cmt4) are interrupted.

FIG. 5E

| In | Current Cache | Out | Next Cache |
|---|---|---|---|
| - | E,S | - | I |

Silent victimization

FIG. 5F

| In | Current Cache | Out | Next Cache |
|---|---|---|---|
| - | E,M | - | M (1) |

Effect of a store

*Notes*

1. Data value is modified by store.

FIG. 5G

| In | Cur. state | | Out | Next state | |
|---|---|---|---|---|---|
| | FSM | Cache | | FSM | Cache |
| CPB | Idle | M,O | Data | Idle | O |
| | | E,S (1) | | | S |
| | | E,S (2) | Ack | | |
| | | I | | | - |
| Nack | Idle | - | - | Idle | - |

Foreign CPB

*Notes*

1. There is an active (not in Idle state) CMT for the same cache line
2. There is no active CMT for the same cache line.

FIG. 5H

| In | Cur. state | | Out | Next state | |
|---|---|---|---|---|---|
| | FSM | Cache | | FSM | Cache |
| CPI | Idle | M,O | Data | ccpil | O |
| | | E,S (1) | | | S |
| | | E,S,I (2) | Ack | Idle | I |
| Ack | ccpil | - | Ack | Idle | I |
| Nack | | | - | - | - |
| Timeout | | | | | |

Foreign CPI

*Notes*

1. There is an active CMT (an FSM not in Idle state handling a CMT) for the same cache line
2. There is no active CMT for the same cache line.

FIG. 5I

| In | Cur. state | | Out | Next state | |
|---|---|---|---|---|---|
| | FSM | Dir. | | FSM | Dir. |
| - | Idle | I | CPB (3) | ccpb1 | - |
| Data | ccpb1 | - | - | Idle | +H (1) |
| Ack | | | | | |
| Replay | | | CPB (2) | ccpb1 | - |
| Retry | | | CPB (3) | | |
| Abandon | | | - | Idle | +H/P |

Home handling of CPB request

*Notes*

1. Accept data.

2. CPB is sent with same sequence number as original request or last retry.

3. CPB is sent with new sequence number.

FIG. 5J

| In | Cur. state | | Out | Next state | |
|---|---|---|---|---|---|
| | FSM | Dir. | | FSM | Dir. |
| - | Idle | S | CPI (3) | ccpi1 | - |
| | | I | | ccpi2 | - |
| Data | ccpi1 | - | Ack | ccpi1 | - (1) |
| Ack (5) | | | - | | -X |
| Ack (6) | | | | Idle | E |
| Replay | | | CPI (4) | ccpi1 | - |
| Retry | | | CPI (3) | | |
| Abandon | | | - | Idle | E/P |
| Data | ccpi2 | - | Ack | ccpi3 | +H (2) |
| Ack | | | - | Idle | E |
| Replay | | | CPI (4) | ccpi2 | - |
| Retry | | | CPI (3) | | |
| Abandon | | | - | Idle | E/P |
| Ack | ccpi3 | - | - | Idle | E |
| Retry | | | CPI (4) | ccpi1 | - |
| Abandon | | | - | Idle | E/P |

Home handling of CPI request

*Notes*

1. Discard data.
2. Accept data.
3. Send CPI with new sequence number to all holders except requester.
4. Send CPI with existing sequence number to origin of Replay.
5. There are still more CPI Acks to be received.
6. There are no more CPI Acks to be received; the only importer other than the requester with a valid directory entry is the source of this Ack.

FIG. 5K

| In | Cur. state | | Out | | Next state | |
|---|---|---|---|---|---|---|
| | FSM | Dir. | Req | Slave(s) | FSM | Dir. |
| RTS | Idle | E,S | Data | - | crts2 | +R |
| | | $E_R$ | | | | - (1) |
| | | I | - | CPB (4) | crts1 | |
| Data | crts1 | - | Data | - | crts2 | +RH (2) |
| Ack | | | | | | |
| Replay | | | - | CPB (3) | crts1 | - |
| Retry | | | | CPB (4) | | |
| Abandon | | | Data/P | -| | crts2 | +RH/P |
| Ack | crts2 | - | - | - | Idle | - |
| Nack | | | | | | |
| Timeout | | | | | | |

Foreign RTS received at Home

*Notes*

1. Do not make Home a holder, because RTS could be stale and importer may still have Mtag E.
2. Accept data.
3. CPB is sent with same sequence number as original request or last retry.
4. CPB is sent with new sequence number.

FIG. 5L

| In | Cur. state | | Out | | Next state | |
|---|---|---|---|---|---|---|
| | FSM | Dir. | Req | Slave(s) | FSM | Dir. |
| RTO (1) | Idle | E | Data | - | crto4 | $E_R$ |
| | | $S_R$ | | | | $E_R$ |
| | | S | - | CPI (6) | crto2 | - |
| | | $E_R$ | Data | - | crto4 | |
| | | I | - | CPI (6) | crto1 | |
| Data (2) | crto1 | - | - | Ack | crto3 | +H (5) |
| Ack (2) | | | Data | - | crto4 | $E_R$ |
| Replay (2) | | | - | CPI (7) | crto1 | - |
| Retry | | | | CPI (6) | | |
| Abandon | | | Data/P | - | crto4 | $E_R$/P |
| Data (2) | crto2 | - | - | Ack | crto2 | - (4) |
| Ack (2,8) | | | | - | | -X |
| Ack (2,9) | | | Data | | crto4 | $E_R$ |
| Replay (3) | | | - | CPI (7) | crto2 | - |
| Retry | | | | CPI (6) | | |
| Abandon | | | Data/P | - | crto4 | $E_R$/P |
| Ack (2) | crto3 | - | Data | | crto4 | $E_R$ |
| Retry | | | - | CPI (6) | crto2 | - |
| Abandon | | | Data/P | - | crto4 | $E_R$/P |
| Ack (1) | crto4 | - | - | - | Idle | - |
| Nack (1) | | | | | | |
| Timeout | | | | | | |

Home: Received RTO

*Notes*

1. From requesting node.
2. From slave node.
3. From interconnect, but appears to Home to originate from Slave.
4. Discard data.
5. Accept data.
6. Send CPI with new sequence number to all holders except requester.
7. Send CPI with existing sequence number to origin of Replay.
8. There are still more CPI Acks to be received.
9. There are no more CPI Acks to be received; the only importer other than the requester with a valid directory entry is the source of this Ack.

*FIG. 5M*

| In | Cur. state | | Out | | Next state | |
|---|---|---|---|---|---|---|
| | FSM | Dir. | Req | Slave(s) | FSM | Dir. |
| RTU (1) | Idle | E | Data | - | crtu5 | $E_R$ |
| | | $S_R$, $E_R$ | Ack | | | $E_R$ |
| | | $S_R+$ | - | CPI (6) | crtu3 | - |
| | | S | | | crtu4 | |
| | | I | | | crtu1 | |
| Data (2) | crtu1 | - | - | Ack | crtu2 | +H (5) |
| Ack (2) | | | Data | - | crtu5 | $E_R$ |
| Replay (3) | | | - | CPI (7) | crtu1 | - |
| Retry | | | | CPI (6) | | |
| Abandon | | | Data/P | - | crtu5 | $E_R$/P |
| Ack (2) | crtu2 | - | Data | - | crtu5 | $E_R$ |
| Retry | | | - | CPI (6) | crtu4 | |
| Abandon | | | Data/P | - | crtu5 | $E_R$/P |
| Data (2) | crtu3 | - | - | Ack | crtu3 | - (4) |
| Ack (2,8) | | | | - | | -X |
| Ack (2,9) | | | Ack | | crtu5 | $E_R$ |
| Replay (3) | | | - | CPI (7) | crtu3 | - |
| Retry | | | | CPI (6) | | |
| Abandon | | | Nack | - | Idle | $E_R$/P |
| Data (2) | crtu4 | - | - | Ack | crtu4 | - (4) |
| Ack (2,8) | | | | - | | -X |
| Ack (2,9) | | | Data | | crtu5 | $E_R$ |
| Replay (3) | | | - | CPI (7) | crtu4 | - |
| Retry | | | | CPI (6) | | |
| Abandon | | | Data/P | - | crtu5 | $E_R$/P |
| Ack (1) | crtu5 | - | - | - | Idle | - |
| Nack (1) | | | | | | |
| Timeout | | | | | | |

RTU received at Home

*Notes*

1. From requesting node.
2. From slave node.
3. From interconnect, but appears to Home to originate from Slave.
4. Discard data.
5. Accept data.
6. Send CPI with new sequence number to all holders except requester.
7. Send CPI with existing sequence number to origin of Replay.
8. There are still more CPI Acks to be received.
9. There are no more CPI Acks to be received; the only importer other than the requester with a valid directory entry is the source of this Ack.

FIG. 5N

| In | Cur. state | | Out | | Next state | |
|---|---|---|---|---|---|---|
| | FSM | Dir. | Req | Slave(s) | FSM | Dir. |
| VCT | Idle | $E_R, S_R$ | CPI | - | cvct1 | - |
| | | $S_R+$ | | | cvct2 | |
| | | Other | Ack | | - | |
| Ack | cvct1 | - | Ack | - | Idle | E |
| Replay | | | CPI | | cvct1 | - |
| cRetry | | | | | | |
| Abandon | | | Nack | | Idle | E/P |
| Ack | cvct2 | - | Ack | - | Idle | ~R |
| Replay | | | CPI | | cvct2 | - |
| cRetry | | | | | | |
| Abandon | | | Nack | | Idle | ~R/P |

Home receiving VCT

*FIG. 50*

| In | Cur. state | | Out | | Next state | |
|---|---|---|---|---|---|---|
| | FSM | Dir. | Req | Slave(s) | FSM | Dir. |
| WB | Idle | $E_R$ | CPI | - | cwb1 | - |
| | | $S_R$/P | Nack | | Idle | E/P |
| | | Other/P | | | | -R/P |
| | | $S_R$ | CPI | | cwb2 | - |
| | | $S_R+$ | | | cwb3 | |
| | | Other | Ack | | Idle | |
| Data | cwb1 | - | Ack | ~ | cwb1 | - (2) |
| Ack | | | | | Idle | E |
| Replay | | | CPI | | cwb1 | - |
| cRetry | | | | | | |
| Abandon | | | Nack | | Idle | E/P |
| Data | cwb2 | - | Ack | ~ | cwb2 | - (1) |
| Ack | | | | | Idle | E |
| Replay | | | CPI | | cwb2 | - |
| cRetry | | | | | | |
| Abandon | | | Nack | | Idle | E/P |
| Data | cwb3 | - | Ack | ~ | cwb3 | - (1) |
| Ack | | | | | Idle | -R |
| Replay | | | CPI | | cwb3 | - |
| cRetry | | | | | | |
| Abandon | | | Nack | | Idle | -R/P |

Home processing of received WB

*Notes*

1. Discard data.
2. Accept data.

*FIG. 5P*

| In | Cur. state | | Out | | Next state | |
|---|---|---|---|---|---|---|
| | FSM | Dir. | Req | Slave(s) | FSM | Dir. |
| CMT | Idle | $E_R$, $E_R$/P | Pull | - | ccmt1 | - |
| | | Other/P | Nack | | Idle | - |
| | | Other | Ack | | | |
| DataW | ccmt1 | - | Ack | - | Idle | - (1) |
| Ack | | | | | | |
| Nack | | | - | | | |
| Timeout | | | | | | |

Home handling of received CMT

*Notes*

1. Accept data.

FIG. 5Q

| In | Out |
|---|---|
| Data (1) | Nack |
| Ack (2) | |
| Pull (3) | |
| Replay (4) | - |
| DataW (5) | |
| Ack (6) | |
| Nack | |

Stale response handling

*Notes*

1. Data messages are always directed at a requester scoreboard.

2. The Ack destination TID either indexes the Requester scoreboard or the destination TID indexes the Home scoreboard and the source TID indexes a Slave scoreboard.

3. Pull messages are always directed at a requester.

4. Replay (from the transport layer) messages are always directed at a requester; no Nack is sent, because the transport layer generated the Nack.

5. DataW messages are always directed at a responder scoreboard.

6. The Ack destination TID either indexes the Slave scoreboard or the destination TID indexes the Home scoreboard and the source TID indexes a Request scoreboard.

FAULT-TOLERANT CACHE COHERENCE OVER A LOSSY NETWORK

CROSS-REFERENCE TO RELATED APPLICATIONS; BENEFIT CLAIM

This application is related to U.S. patent application Ser. No. 15/859,037, entitled "Fault-Tolerant Cache Coherence Over A Lossy Network", filed concurrently herewith, the entire contents of which are hereby incorporated by reference as if fully set forth herein.

TECHNICAL FIELD

The present disclosure relates to cache coherence protocols. More specifically, the disclosure relates to fault-tolerant cache coherence over a lossy network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cache coherence refers to the uniformity of shared resource data that is stored in multiple caches. Maintaining cache coherence across plurality of multiprocessor computing devices can be challenging. A node is a multiprocessor computing device. Each processor in a node may have its own main memory and its own cache. Intranode cache coherence across the caches in a single node must be maintained to ensure the accuracy and uniformity of the cache contents within the node. Furthermore, in a cluster of nodes, internode cache coherence must be maintained across the caches of the different nodes to ensure the accuracy and uniformity of the cache contents across the nodes of the cluster.

Traditional approaches to such cache coherence in a cluster of nodes employ hardware-implemented coherence protocols on an intranode basis and software-implemented coherence protocols on an internode basis. The user of software-implemented coherence protocols for internode coherence in the cluster, however, introduces various inefficiencies. In a software implemented protocol, every data access message between two nodes requires execution of a multiple software processes. Such software processes may include, but are not limited to, sending a request to a requesting node's operating system, software calls to system drivers on the requesting node, software calls to I/O systems on the requesting node, software processing an interrupt to the requesting node's operation system, and execution of other software processes to communicate a single message to another node in the cluster. Likewise, on the responding node, similar software processes are necessary. Such software processes are thus inefficient, as there is significant overhead in processing software on both the requesting node and the responding node with every message sent between those nodes.

Furthermore, such a software-implemented coherence protocol for internode coherence provides poor scaling as the number of the nodes in the cluster grows. With every additional node added to the cluster, the number of software processes necessary for processing the internode messages grows significantly, thereby degrading system performance.

Additionally, a software-implemented coherence protocol for internode coherence is prone to system failure in a lossy network where packets may be lost between nodes. Specifically, if an internode message is lost via a lost packet, the entire system of nodes will crash in a software-based implementation.

Thus, what is needed is an improved system for maintaining internode and intranode cache coherence in a lossy network that does not rely on software-based implementation of the coherence protocols.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIGS. 5A through 5R are tables that illustrate transition rules for finite state machines of a protocol layer of the cache coherence system, according to some example embodiments.

Figure 1:
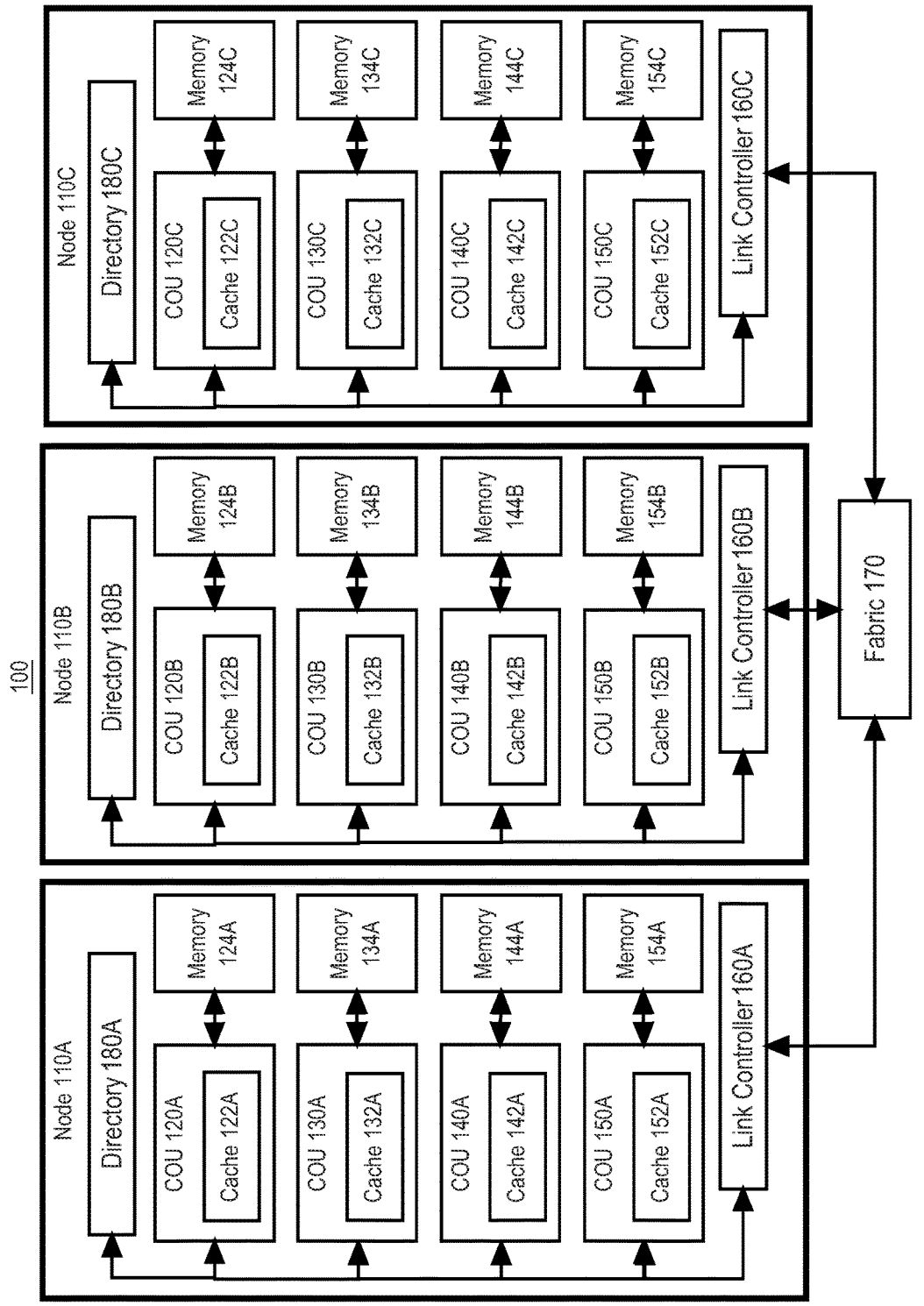
FIG. 1 is a block diagram of a cache coherence system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

General Overview

A cache coherence system manages both internode and intranode cache coherence in a cluster of nodes. Each node in the cluster of nodes is either a collection of processors running an intranode coherence protocol between themselves, or a single processor. A node comprises a plurality of coherence ordering units (COUs) that are hardware circuits configured to manage intranode coherence of caches within the node and/or internode coherence with caches on other nodes in the cluster. Each node contains one or more directories which tracks the state of cache line entries managed by the particular node. Each node may also contain one or more scoreboards for managing the status of ongoing transactions with other nodes in the cluster. The internode cache coherence protocol implemented in the COUs may be used to detect and resolve communications errors, such as dropped message packets between nodes, late message delivery at a node, or node failure. Additionally, a transport layer manages communication between the nodes in the cluster, and can additionally be used to detect and resolve communications errors.

In this description, the following terminology may be used. The following terminology is not intended to be limiting in any way.

An "Ack" or "acknowledgement" is a response to a request that indicates that the request has been received.

A "cache line" is a coherence unit of data and its associated address in memory.

The term "clean" refers to a copy of a cache line that is not dirty.

A "coherence ordering unit" or "COU" is a hardware unit or hardware circuit that acts as a cache controller. The COU may be implemented to manage internode and/or intranode cache coherence in a cluster of nodes. A COU may be implemented as a combination of one or more of processor(s), register(s), content-addressable memories (CAMs), and/or other computer-implemented hardware circuitry.

A "coherence unit" is the amount of data for which the coherence protocol maintains coherence. In some embodiments, a coherence unit may be either 64 bytes or 128 bytes.

A "Commit" or "CMT" request is a request sent by an importing node to a home node to commit a copy of the importing node's cache line which was previously marked as exclusive dirty at the importing node's cache.

A "Copy Back" or "CPB" request is a request sent by a home node to a slave node to request a readable copy of a cache line that has been previously exported for writing by the slave node.

A "Copy Back and Invalidate" or "CPI" request is a request sent by a home node to a slave node to request a readable copy of a cache line and invalidate the copy of the cache line at the slave node.

A "cyclic redundancy code" or "CRC" is a set of extra redundant bits added to data to allow detection of transmission errors.

The term "dirty" refers to a copy of a cache line at an importing node that is marked as modified while the transmission of that modification to the home node has not yet been confirmed to the importing node.

A "home" or "home node" for a memory location refers to the particular node in a cluster of nodes that hosts the physical memory containing the memory location. In an embodiment, the home node may host a directory for a directory-based coherence protocol.

An "importer" or "importing node" is a node that can access memory locations physically resident on another home node.

A "node" is either a collection of processors running an intranode coherence protocol between themselves, or a single processor. In an embodiment, a node may be implemented as a shared memory multiprocessor.

A "node ID" is unique identifier associated with a particular node.

The term "poisoned" refers to a cache line copy that has been marked after experiencing certain protocol errors. In an embodiment, an indication that a cache line copy has been marked as poisoned may be made in hardware, memory, and/or a processor cache of a node. This poisoning causes loads and stores to the cache line to trap the issuing thread rather than being performed.

A "Replay" message is a message sent by the transport layer to indicate that a given request or a returned message has been lost and that the request should be retried. In this case the retried request does not need a new sequence number, as the same message is sent again.

A "Request" message is a message that initiates a dialogue. In an embodiment, a request may carry a request type, cache line address, TID, and for systems supporting late delivery, a sequence number.

The "requester" or "requester node" of a dialogue between two nodes is the initiator of the dialogue, which starts with a request from the requester to the responder.

The "responder" or "responder node" of a dialogue between two nodes is the node that receives the initial request by the requester.

A "response" is any protocol message that is not a request. In an embodiment, a response carries one or more of: a source TID, a destination TID, a sequence number, and/or a response type. In an embodiment, a response may also carry data.

A "Retry" message for a given message is the resending of the message after a timeout. Because messages associated with the timed out request could still be in the network, the retried request must carry a new sequence number. Thus, a Retry is different from a Replay in that a Retry uses a new sequence number and a Replay uses the same sequence number. Retries are only used for a requester.

A "Request to Own" or "RTO" is a request sent by an importing node to the home node to obtain a read-write copy of a memory location.

A "Request to Share" or "RTS" is request sent by an importing node to the home node to obtain a read-only copy of a memory location.

A "Request to Upgrade" or "RTU" is a request sent by an importing node to the home node to upgrade a read-only copy to a read-write copy of a memory location.

A "Sequence number" or "SEQ" is a value that is attached to messages to allow the detection of lost messages. A "Transport Sequence Number" or "TSN" is a type of sequence number that is allocated by a transport layer.

A "slave node" is an importer node that has read-write access to a copy of a cache line for a home node.

A "store buffer" is a buffer that stores instructions to retire before write access has been granted. In an embodiment, each thread of execution may have its own store buffer. When the store is performed, the store exits the store buffer.

A "Temporary End of Transmission" or "TET" refers to a message that is sent to detect any loss of an earlier message sent to the same destination over the same route.

A "Transaction ID" or "TID" is a unique identifier for a particular transaction. A TID is allocated by a requester or responder to index any local state pertaining to a given transaction.

A "Victimize" or "VCT" request is a request that may be issued by an importing node to evict a clean cache line.

A "Write Back" or "WB" request is a request that is issued by an importing node to evict a dirty cache line.

Example Computer System Implementation

FIG. 1 illustrates an example cache coherence system in which the techniques described herein may be practiced, according to some embodiments. In the example of FIG. 1, cache coherence system 100 is a computer system configured to manage cache coherence on an intranode and internode basis and may be implemented across one or more computing devices. The example components of cache coherence system 100 shown in FIG. 1 are implemented at least partially by hardware at one or more computing devices. In other words, all functions described herein are intended to indicate operations that are performed in a special-purpose computer or general-purpose computer, in various embodiments. Cache coherence system 100 illustrates only one of many possible arrangements of components configured to configure the cache coherence protocol described herein. Other arrangements may include fewer or different components, and the division of work between the components may vary depending on the arrangement.

Cache coherence system 100 includes a plurality of nodes 110A, 110B, and 110C organized into a cluster. Each node 110A, 110B, and 110C is a shared memory multiprocessor computing device. Although cache coherence system 100 is depicted in FIG. 100 as including three nodes 110A, 110B, and 110C, in other embodiments, a different number of nodes may be used.

The contents of each of nodes 110A, 110B, and 110C may be similar. Further description with regards to the features of the components of node 110A will be described, but analogous features would be implemented in nodes 110B, 110C, or any other node in the cluster.

Node 110A includes a plurality of coherence ordering units (COUs) 120A, 130A, 140A, and 150A. Although node 110A is depicted as including four COUs, in other embodiments, the number of COUs may differ. A COU is a cache controller hardware unit that is configured to help manage cache coherence for internode coherence and intranode coherence in cache coherence system 100. A COU may be implemented on a chip and may include a processor, one or more registers, and/or one or more content-addressable memories (CAMs).

Each COU 120A, 130A, 140A, and 150A may be associated with one or more caches. In the example of cache coherence system 100, COU 120A is associated with cache 122A, COU 130A is associated with cache 132A, COU 140A is associated with cache 142A, and COU 150A is associated with cache 152A. In cache coherence system 100, the caches 122A, 132A, 142A, and 142A are depicted as part of the COUs 120A, 130A, 140A, and 150A, respectively, however, in other embodiments, the caches 122A, 132A, 142A, and 142A may be external to COUs 120A, 130A, 140A, and 150A.

Each COU 120A, 130A, 140A, and 150A may be associated with a main memory 124A, 134A, 144A, and 154A, respectively. In some embodiments, each COU 120A, 130A, 140A, and 150A may further share a single main memory (not depicted). The main memory for each COU 120A, 130A, 140A, and 150A stores the underlying data for the memory locations that the given COU is responsible for.

A given COU 120A is thus configured to serve as a cache controller using cache 122A and memory 124A. The COUs 120A, 130A, 140A, and 150A are configured to maintain intranode coherence of their respective caches using existing hardware-implemented cache coherence protocols. Furthermore, COUs 120A, 130A, 140A, and 150A are configured to maintain internode coherence of their respective caches using hardware-implemented cache coherence protocols in communication with the COUs 120B, 130B, 140B, and 150B on node 110B and the COUs 120C, 130C, 140C, and 150C on node 110C. Thus, the nodes 110A, 110B, and 110C in the cluster maintain internode cache coherence by use of a cache coherence protocol implemented in the respective COUs of the nodes, as will be described herein in more detail.

Node 110A may include a directory 180A. Directory 180A manages state information regarding cache lines stored on node 110A where node 110A is the home node. Directory 180A further manages the state information regarding copies of these cache lines stored on importer nodes 110B and 110C. In an embodiment, directory 180A may store information that identifies, which cache 122A, 132A, 142A, or 152A and/or which memory 124A, 134A, 144A, or 154A stores the data for a given memory location. Thus, directory 180A may be used by COUs 120A, 130A, 140A, and/or 150A to lookup or find data stored on node 110A. In one embodiment, directory 180A may be exclusively implemented in hardware, such as a combination of one or more of processor(s), register(s), content-addressable memories (CAMs), and/or other computer-implemented hardware circuitry. However, in another embodiment, directory 180A may be implemented in a combination of hardware and software. Further details regarding directory 180A will be described herein.

Node 110 may additionally include one more scoreboards (not depicted) that maintains information regarding pending incoming and outgoing messages. The scoreboard is used to maintain cache coherence by the COUs 120A, 130A, 140A, and 150A, as will be described herein. In an embodiment, the scoreboard may be stored in one or more hardware circuits, such as a combination of one or more register(s), content-addressable memories (CAMs), and/or other computer-implemented hardware circuitry.

COUs 120A, 130A, 140A, and 150A are communicatively coupled to a link controller 160A. Link controller 160A is a hardware unit configured to perform I/O with other nodes in the cluster via fabric 170. A link controller 160A may be implemented as a combination of one or more of processor(s), register(s), CAM(s), and/or other computer-implemented hardware circuitry. Thus, COUs 120A, 130A, 140A, and 150A may use link controller 160A to manage communication with the COUs on nodes 110B, and 110C in the example of cache coherence system 100.

Fabric 170 is a switch fabric and may include one or more communication switches and/or links. Fabric 170A is configured to manage internode communication amongst nodes 110A, 110B, and 110C that are organized in a cluster. Fabric 170 may be a lossy network, thus communication packets sent via fabric 170 may be lost or delayed in delivery. In an embodiment, fabric 170 may be implemented in accordance with the InfiniBand standard.

By implementing both internode and intranode cache coherence protocols using hardware-implemented cache coherence, as opposed to software-implemented cache coherence for internode cache coherence, the cache coherence system 100 provides various improvements to cache coherence in a cluster of nodes. First, the internode coherence protocol of the cache coherence system 100 may be used to detect and handle message losses, late delivery of messages, and/or node failure which would normally cause a software-based implementation to crash the entire cluster. Second, the transport layer of the cache coherence system 100 may be used to detect and handle message losses, late delivery of messages, and/or node failure, providing another layer of protection against a crash of the entire cluster. Third, the present cache coherence system 100 provides improved message communication by limiting the number of software processes called during message communication between nodes and instead relying on a hardware implementation for message communication and coherence. Fourth, the improved message communication of the cache coherence system 100 additionally provides improved scaling of the number of nodes in a cluster that a software-based implementation cannot provide. Further details regarding the implementation of the system will be described herein.

Internode Cache Coherence Protocol—Overview

Cache coherence system 100 maintains coherence among caches across nodes 110A, 120A, and 130A by adhering to a hardware-implemented cache coherence protocol. The logic of the cache coherence protocol is implemented in the hardware circuit of the various COUs of the cache coherence system 100. Thus, the cache coherence protocol may be partially implemented in a protocol layer at one or more hardware circuits of the various COUs of cache coherence system 100.

In cache coherence system 100, every memory location has a designated home node which hosts the main memory containing that memory location. Any other node holding a copy of that memory location in a cache is an "importing node" or "importer". Each coherence request initiates a dialogue between a requester node and a responder node, where either the requester node or the responder node is the home node. A request from an importing node to the home node may cause the home node to initiate a secondary request to one or more additional importing nodes.

In an embodiment, if any node holds a non-exclusive copy of a cache line, then the home node also holds a copy of the cache line to guard against the loss of data if the importing node fails or suffers an error. Thus, the present system provides protection from node failure or node loss.

In an embodiment, a directory 180 may be implemented in a home node that indicates the status of cache lines for the node. For example, the directory may indicate the current state of the local cache copy of the cache line on the home node, as well as the currently known state of the copies of the cache line on importing nodes. Thus, the directory may be used to determine the current state of the cache line and identify which nodes in the cluster have read, write, exclusive, shared, and/or invalid copies of the cache line. In an embodiment, the directory may be implemented exclusively in hardware, however, in another embodiment, the directory may be partially implemented in software as well. In an embodiment, one shared directory may exist for all the COUs located on a single node, however, in another embodiment, multiple directories may exist for each COU located on the single node. The contents of the directory may be updated whenever relevant state information for a cache line on the home node is updated.

In an embodiment, the dirty indication in an importing node may be imprecise. For example, if the importer's copy differs from that in the home node, the importer's copy is marked dirty. However, the importer's copy being marked dirty does not imply that it differs from the home node's copy. Examples of this scenario will be described herein.

In an embodiment, if a dirty data copy of a cache line is transferred from an importing node to the home node, then its arrival at the home node is confirmed before the copy is cleaned or invalidated at the importing node.

Internode Cache Coherence Protocol—Cache Line States

A copy of a cache line in a given cache may have any of the following states:

The "Modified" or "M" state indicates that a copy of a cache line in a given node is exclusive dirty. Thus, the node has the only valid copy of the cache line and has made modifications to that copy.

The "Owned" or "O" state indicates that a copy of a cache line in a given node is shared dirty. Thus, the node is one of several nodes with a valid copy of the cache line, but the node has the exclusive right to make modifications to the cache line.

The "Exclusive" or "E" state indicates that a copy of a cache line in a given node is exclusive clean. Thus, the node has the only copy of the cache line, and that copy of the cache line is unmodified.

The "Shared" or "S" state indicates that a copy of a cache line in a given node is shared clean. Thus, the node is one of several nodes with a valid copy of the cache line, and the node does not have permission to modify the copy.

The "Invalid" or "I" state indicates that a copy of a cache line in a given node is invalid. Thus, the copy of the cache line in the node may not be used for an attempted data access. The cache line must be fetched from another source.

Internode Cache Coherence Protocol—Transaction Types

The cache coherence system 100 supports the following transactions between nodes: CMT, CPB, CPI, RTO, RTS, RTU, VCT, and WB.

In a CMT transaction, an importing node sends a request to a home node to commit a copy of the importing node's cache line which was previously marked as exclusive dirty at the importing node.

In a CPB transaction, a home node sends a request to a slave node to request a readable copy of a cache line that has been previously exported for writing by the slave node.

In a CPI transaction, a home node sends a request to a slave node to request a readable copy of a cache line and invalidate the copy of the cache line at the slave node.

In an RTO transaction, an importing node sends a request to a home node to upgrade a read-only copy to a read-write copy of a cache line. An RTO transaction is issued from state I.

In an RTS transaction, an importing node sends a request to a home node to obtain a read-only copy of a cache line.

In an RTU transaction, an importing node sends a request to a home node to upgrade a read-only copy to a read-write copy of a cache line. An RTU transaction is issued from state S. Thus the subsequent actions for RTO and RTU may be different based on the issuing state.

In a VCT transaction, an importing node sends a request to a home node to evict a clean cache line.

In a WB transaction, an importing node sends a request to a home node to evict a dirty cache line.

Internode Cache Coherence Protocol—Scoreboard

Each node in cache coherence system 100 may maintain multiple scoreboards in one or more hardware units of the node. A scoreboard is used to manage information on the status of transactions being performed by the node. Each node may include three scoreboards: an importer scoreboard, a home scoreboard, and/or slave scoreboards. The importer scoreboard is used to manage requests from the node for changing access rights for imported cache lines. The home scoreboard is used for handling such requests from other importing nodes, including issuing secondary requests to other importing nodes. The slave scoreboard is used to manage the handling of requests from a separate home node for imported cache lines.

Each scoreboard comprises multiple entries. In an embodiment, a scoreboard entry includes a transaction ID (TID) which is a unique identifier that identifies a transaction assigned by the particular node.

In an embodiment, a scoreboard entry includes a sequence number (SEQ). A sequence number is a unique identifier for a particular message in a transaction, and there may be multiple sequence numbers associated with a single transaction. Messages sent between nodes may thus include TIDs and SEQs in the body of the message so that the receiving node can identify the relevant transaction that a particular request pertains to. The information regarding pending transaction IDs and sequence numbers is stored in the scoreboards. The sequence number may be incremented for each individual message for the transaction.

To illustrate an example, assume a simple request where a requester node requests a cache line from a home node. First, the requester node creates a new requester node transaction ID for the request, which, in this example will be "75". The first requester node sequence number for the transaction will be "0". The requester node can thus send a message to the home node that includes the request for a cache line that includes the information: (Message_Type=Request, Req_Node_TID=75, Req_Node_SEQ=0). The information about this requester node TID and requester node SEQ may then be stored in an importer scoreboard on the requester node, along with a description of the request type.

Next, the home node receives the request. The home node creates a new transaction ID for itself, which, in this example will be "54". The first sequence number for the transaction will be "0", which refers to the incoming request. This information regarding this incoming request is stored in the home node's home scoreboard. The home node can then send a response to the requester node that includes the requested data. The response will include the home node transaction ID of "54", as well as newly incremented home node sequence number of "1". This information about the outgoing response may also be stored in the home node's scoreboard. Thus, the response from the home node to the requester node which includes the requested data may include the information: (Message_Type=Data, Req_Node_TID=75, Req_Node_SEQ=0, Home_Node_TID=54, Home_Node_SEQ=1). Upon receiving the response, the requester node may update the requester node's importer scoreboard with this information to indicate that it has successfully received a response message to the initial outgoing request.

The requester node may then increment its own requester node SEQ to "1" and include that with an Acknowledgement message that is sent to the home node. The acknowledgement message may thus include the information: (Message_Type=Ack, Req_Node_TID=75, Req_Node_SEQ=1, Home_Node_TID=54, Home_Node_SEQ=1). This information can be stored in the requester node's importer scoreboard. Thus, each node's respective scoreboards allow the node to keep track of incoming and outgoing messages and the status of ongoing transactions in order to assist with maintaining cache coherence. A given node may examine the contents of the scoreboard to determine the current state of pending transaction. In an embodiment, a scoreboard is implemented in hardware of the node, such as registers and/or CAMs, without the need for software implementation.

In other embodiments, a scoreboard may include additional details regarding messages. For example, in an embodiment, a scoreboard entry includes a request type (REQ) that identifies the request type for a message, including, but not limited to RTS, RTO, RTU, WB, VCT, CPB, CPI, or CMT.

In an embodiment, a scoreboard entry includes a source node ID (SNID) that identifies the source node of the message.

In an embodiment, a scoreboard entry includes a source transaction ID (STID) which is the TID of the corresponding node for the SNID.

In an embodiment, a scoreboard entry includes a destination node ID (DNID) that identifies the destination node of the message.

In an embodiment, a scoreboard entry includes a cache line address (ADR) that identifies the memory location of the cache line.

In an embodiment, when a transaction is successfully completed at a given node, the scoreboard entries for the given transaction are wiped from the scoreboard and the transaction ID is incremented for the next transaction. Wiping the scoreboard entries for the given transaction frees up the limited space in the implementing hardware of the scoreboard, thereby improving system efficiency. The starting sequence number for a separate transaction may be the same as the prior starting sequence numbers used for other transactions.

Internode Cache Coherence Protocol—Implementation

Figure 2A:
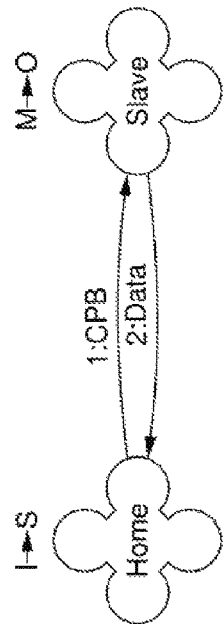
FIGS. 2A through 2AI are diagrams that describe message communication and state management in a cache coherence system, according to some example embodiments.

FIGS. 2A through 2AI depict message communications and state information for an internode cache coherence protocol of cache coherence system 100 for different scenarios of message communications. FIGS. 2A through 2AI may be implemented in the hardware of the COUs of the nodes of cache coherence system 100. FIGS. 2A through 2AI are intended to describe certain embodiments for implementing the internode cache coherence protocol, however, variations may be included in other embodiments. FIGS. 2A through 2AI describe state transitions and message communication between nodes to support these various transactions in different scenarios.

Home Node Requesting Read-Only Access

The home node normally only needs to obtain read-only access when an importing node has read-write access to the cache line. The only situation in which a home node does not hold a readable copy of a cache line is when the cache line has been exported for writing by an importing node.

FIG. 2A depicts an embodiment of the cache coherence protocol for a transaction when a home node issues a CPB request to a slave node and the slave node is dirty. Home node issues a 1:CPB request to the slave node. The slave node returns 2:Data that provides the copy of the requested data to the home node. The state of the cache line on the home node is modified from I to S to indicate that the home node now has a shared clean copy of the cache line. The state of the cache line on the slave node is modified from M to O to indicate that the slave node now has a shared dirty copy of the cache line. The state of the cache line on the slave node is O to indicate that the slave node has not yet received a confirmation that the modified cache line from the slave node is safely recorded at the home node.

Figure 2B:
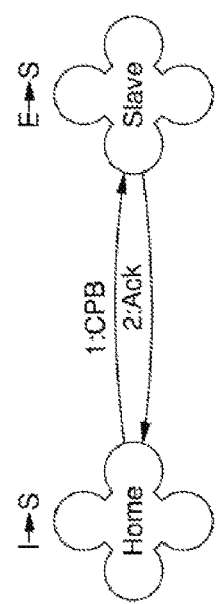

FIG. 2B depicts an embodiment of the cache coherence protocol for a transaction when a home node issues a CPB request to a slave node and the slave node is clean. Home node issues a 1:CPB request to the slave node. The slave node returns 2:Ack to indicate that its copy of the cache line is clean so that the home node can use its own copy of the cache line. The state of the cache line on the home node is modified from I to S to indicate that the home node now has a shared clean copy of the cache line. The state of the cache line on the slave node is modified from E to S to indicate that the slave node now has a shared clean copy of the cache line. By returning a 2:Ack message instead of 2:Data in this example, the present system limits the amount of unnecessary data included in response message, thereby improving the efficiency of message communication.

Importing Node Requesting Read-Only Access

An importing node may request read access to a memory location on a home node when the importing node has no access to that memory location.

Figure 2C:
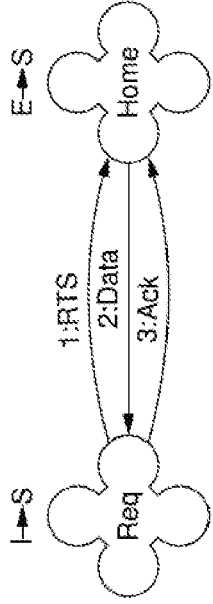

FIG. 2C depicts an embodiment of the cache coherence protocol for a transaction when a requester node issues a RTS request to a home node and the home node has an exclusive clean copy of the requested data. The requester node does not have a copy of the imported cache line. The home node is the only node holding the cache line. The dialogue between the requester node and the home node begins when the requester node issues a 1:RTS request to the home node. The home node locks its directory, thereby preventing processing of other requests to the RTS's desired memory location. The home node then returns 2:Data to the requester node. The home node updates the local state for the cache line from E to S to indicate that the home node now stores a shared clean copy of the cache line. The requester node receives the data and upgrades its state for the cache line from I to S to indicate that it now has a shared clean copy of the cache line. The requester node then sends 3:Ack to the home node to indicate that it has received the data. The home node, in response to receiving 3:Ack, then unlocks the directory, thereby allowing the processing of further requests to the memory location. The home node can safely update the directory upon return of data. Loss of data messages results in the requester not installing the memory location and the possibility of either another retried RTS by the requester node or the requester node receiving an unnecessary request from the home before any retried RTS is processed at the home node. Thus, the present system can help ensure that the system is stable when a packet is lost during transmission between the requesting node and the home node. Further details regarding the handling of a lost packet will be described herein.

Figure 2D:
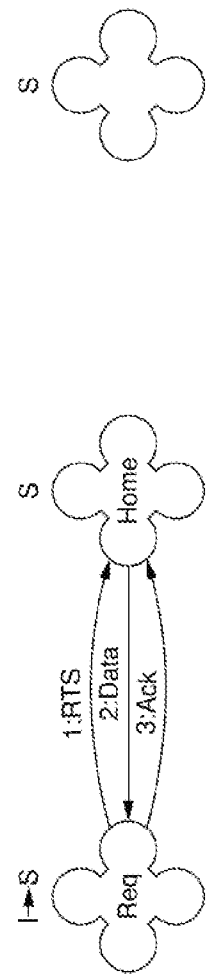

FIG. 2D depicts an embodiment of the cache coherence protocol for a transaction when a requester node issues a RTS to a home node and the home node has a shared clean copy of the requested data, where another importer node also has a shared clean copy of the requested data. The dialogue of FIG. 2D is similar to that of FIG. 2C, but in FIG. 2D, the home node has a shared clean copy (S) of the requested cache line, therefore it supplies 2:Data to the requester without updating the state of the cache line at the home node.

Figure 2E:
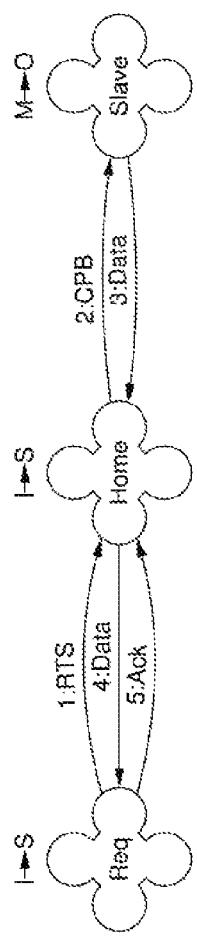

FIG. 2E depicts an embodiment of the cache coherence protocol for a transaction when a requester node issues a RTS to a home node, and another slave node has an exclusive dirty copy of the data. The dialogue between the requester node and the home node begins when the requester node issues a 1:RTS request to the home node. Before the home node can supply data to the requester node, it obtains the data from the slave node that owns the data by issuing a secondary 2:CPB request to the slave node. The slave node returns the data via 3:Data and downgrades its state from M to O to indicate that it now has a shared dirty copy of the cache line. The home node saves a copy of the data and forwards the data in 4:Data to the requester node. The home node's data is updated as the data is forwarded to the requester node to ensure that the data is not lost, should an importing node fail. The home node updates its state from I to S to indicate it too is storing a shared clean copy of the cache line. Upon receiving the data, the requester installs it in state S and sends a final acknowledgment 5:Ack to the home node.

Figure 2F:
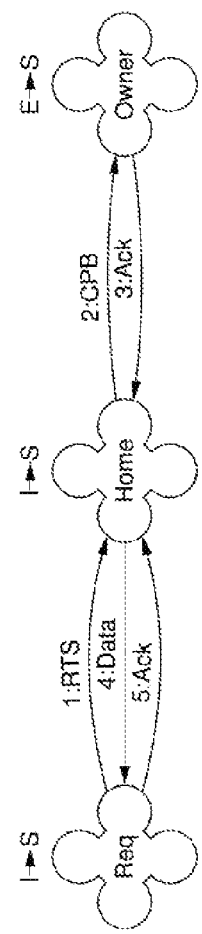

FIG. 2F depicts an embodiment of the cache coherence protocol for a transaction when a requester node issues a RTS to a home node, and another slave node has an exclusive clean copy of the data. In this scenario, the home node's copy is therefore current, even though the home node's state is in I. The workflow of FIG. 2F is thus the same as FIG. 2E, except now the slave node can supply 3:Ack instead of 3:Data to the home node. The data that is sent to the home node is supplied from home node's memory, as it is up-to-date, even though it is marked as I. By sending 3:Ack instead of 3:Data, the cache coherence system can improve the efficiency of message communication, as a data message is larger than an acknowledgement message.

Home Node Requesting Read-Write Access

In general, the home node is initialized with read-write access. The following examples thus assume some preceding importer requests that have modified the initialized state.

Figure 2G:
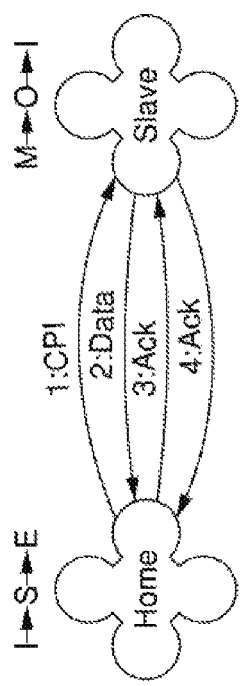

FIG. 2G depicts an embodiment of the cache coherence protocol for a transaction when a home node is obtaining read-write access to data that is stored in an exclusive dirty (M) state on a slave node. This scenario may happen, for example, when a requesting node requests data from the home node and there is a store miss at the home node and the home node has no valid copy of the cache line. The dialogue begins when the home node sends a 1:CPI request to the slave node that has read-write access to the cache line. In this case the cache line is dirty at the slave. The slave downgrades its state from M to O as it supplies 2:Data to the home node. When the home node receives the data, it updates its state from I to S to indicate that it now has a shared clean copy of the data. The home node sends an acknowledgement 3:Ack to the slave node. Upon receiving the 3:Ack at the slave node, the slave node updates its state from O to I to invalidate its copy. Finally, the slave node sends an acknowledgement 4:Ack to the home node. The home node then upgrades its state from S to E to indicate it has an exclusive clean copy of the data. The multiple state transitions in this example ensures that the home node is successfully updated and that a lost packet between the home node and the slave node does not compromise the cache coherence.

Figure 2H:
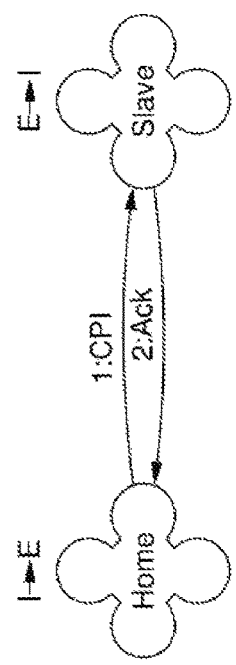

FIG. 2H depicts an embodiment of the cache coherence protocol for a transaction when a home node is obtaining read-write access to data that is stored in an exclusive clean state on a slave node. FIG. 2H thus shows the scenario of FIG. 2G, but in this case the slave has a clean copy. The home node sends a 1:CPI request to the slave node. Since the slave node has a clean copy of the data, it responds with a 2:Ack acknowledgement and updates the slave node state from E to I to indicate that its copy is now invalid. The home node, upon receiving 2:Ack, upgrades itself to E to indicate that it now has an exclusive clean copy of the data.

Figure 2I:
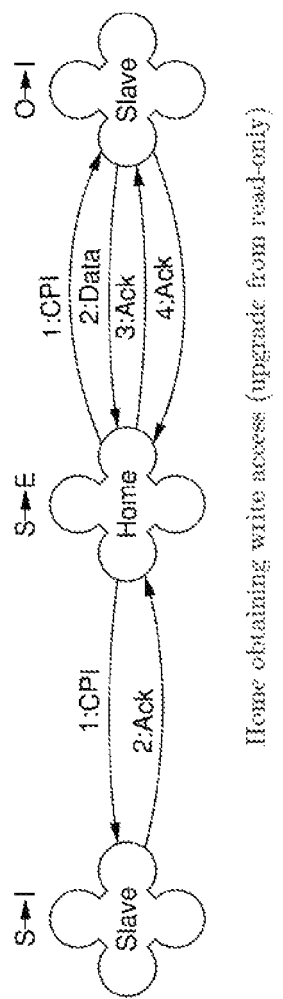

FIG. 2I depicts an embodiment of the cache coherence protocol for a transaction when a home node is upgrading from read-only permission to read-write permission. FIG. 2I thus shows a home node store upgrade miss. The cache line is shared by two importing slaves, one with a clean copy (S) and the other with a dirty copy (O). The home node sends a 1:CPI request to each slave. The slave with a dirty copy returns data via 2:Data, which is discarded because the home node already has a valid copy. The 3:Ack acknowledges the arrival of the data so that the dirty-copy slave can invalidate its copy and return the final 4:Ack. The slave updates its state from O to I to indicate that its copy is now invalid. The other slave invalidates its clean copy upon receipt of 1:CPI, and returns 2:Ack. After receiving all Acks, the home node can upgrade its access rights from S to E, allowing write access.

Importer Node Requesting Read-Write Access

Figure 2J:
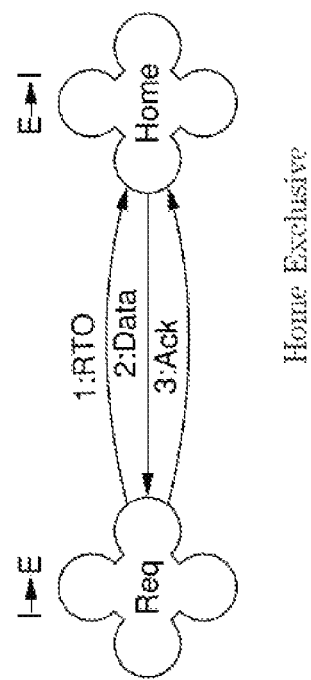

FIG. 2J depicts an embodiment of the cache coherence protocol for a transaction when a requesting node is requesting read-write access for data held in an exclusive clean (E) state by the home node. The requesting node does not have a copy of the imported cache line. The home node is the only node holding the cache line, therefore, it makes no difference whether the home node has a cached copy, or whether the only copy is in memory. The RTO dialogue begins with the requester node sending a 1:RTO request to the home node. The home node responds with 2:Data to the requester. The home node also sets the state of its own copy of the requested data to I to indicate that it is now invalid. The home node also updates its directory to indicate that the requesting node is the exclusive holder of the cache line. The home node may lock the directory. The requester node receives the data and upgrades its state to E. The requester node then acknowledges the receipt of the data by sending 3:Ack to the home node. Upon receipt of the acknowledgment, the home node unlocks the directory, allowing the processing of further transactions to the same cache line. If either 2:Data or 3:Ack packet is lost, the home node will unlock the directory after a timeout. If the 2:Data is lost, then the only copy of the cache line is in the home node's memory in state I.

Figure 2K:
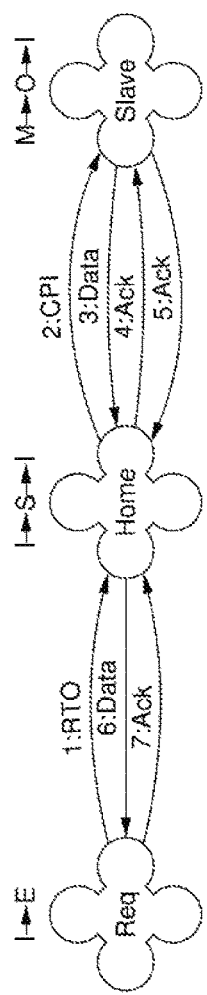

FIG. 2K depicts an embodiment of the cache coherence protocol for a transaction when a requesting node is requesting read-write access when another importer node has an exclusive dirty (M) copy of the data. The requester node begins by sending a 1:RTO request to the home node. Before the home node can supply the data to the requester node, it obtains the data from the slave node that owns the data using a secondary 2:CPI request. The slave node responds with 3:Data to the home node and downgrades its state from M to O. The home node saves a copy of the data received from 3:Data and updates its state to S. The home node sends a 4:Ack response to invalidate the cache line at the slave node, which downgrades its state from O to I and sends 5:Ack back to the home node. When the acknowledgment is received from the slave node, the home node sends the data via 6:Data to the requester node, which then sends a final acknowledgment 7:Ack to the home node. The home node updates its state to I and the requester node updates its state to E to indicate that it now has an exclusive clean copy of the cache line. In this scenario, the dialogue between the requester node and the home node has not changed from the case shown in FIG. 2J. The separation of the initial data transfer 3:Data and the invalidation of the slave via 4:Ack ensures that the system can successfully recover from a lost message, as data must arrive at the home node before the slave node is allowed to discard the cache line.

Figure 2L:
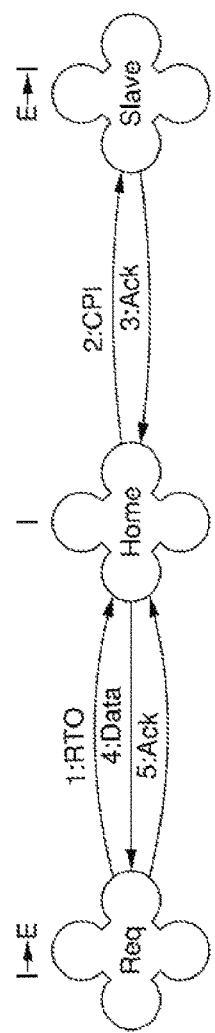

FIG. 2L depicts an embodiment of the cache coherence protocol for a transaction when a requesting node is requesting read-write access when another importer node has an exclusive clean (E) copy of the data. The requester node begins the dialogue with the request 1:RTO to home node. The home node then initiates 2:CPI to the slave node. The slave node sends 3:Ack to the home node, thereby indicating the home node's copy of the data is up-to-date despite being marked I. The slave node now updates its state to I. The home node finally responds with 4:Data, which is supplied from the home node's memory. The requester node updates its state to indicate that it now has an exclusive clean copy of the data and send 5:Ack to the home node to acknowledge receipt of the data.

Figure 2M:
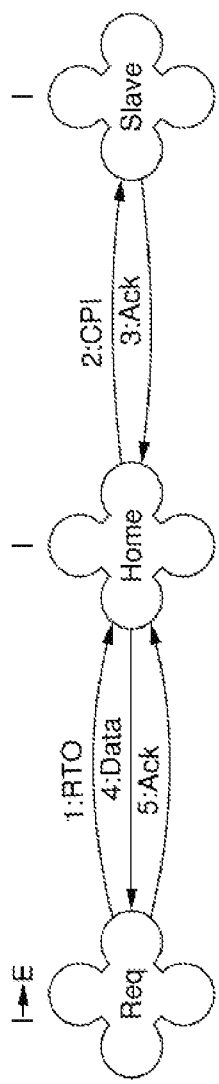

FIG. 2M depicts an embodiment of the cache coherence protocol for a transaction when a requesting node is requesting read-write access when the supplying slave node is marked invalid (I). The requester node begins the dialogue with the request 1:RTO to home node. The home node then initiates 2:CPI to the slave node. The CPI request sees an invalid cache line state at the slave node. The slave node sends 3:Ack to the home node, thereby indicating the home node's copy of the data is up-to-date despite being marked I. The slave node does not need to update its state, as it is already marked as invalid (I). The home node responds with 4:Data, which is supplied from the home node's memory. The requester node updates its state to indicate that it now has an exclusive clean copy of the data and sends 5:Ack to the home node to acknowledge receipt of the data.

Figure 2N:
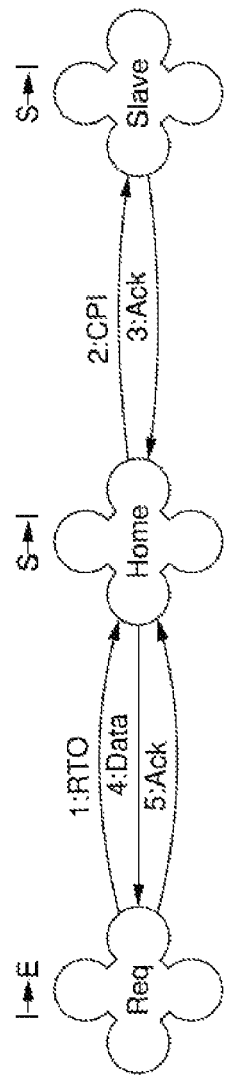

FIG. 2N depicts an embodiment of the cache coherence protocol for a transaction when a requesting node is requesting read-write access when another importer node has a shared clean (S) copy of the data. The requester node begins the dialogue with the request 1:RTO to home node. The home node then initiates 2:CPI to the slave node. The slave node sends 3:Ack to the home node, thereby indicating the home node's copy of the data is up-to-date. The slave node now updates its state to I to indicate that its data is invalid. The home node responds with 4:Data. The requester node updates its state to indicate that it now has an exclusive clean copy of the data and send 5:Ack to the home node to acknowledge receipt of the data. The home node updates its state to indicate that it is now invalid (I). In other embodiments, the illustrated case extends to multiple sharing importing nodes.

Upgrading from Read-Only to Read-Write

Figure 2O:
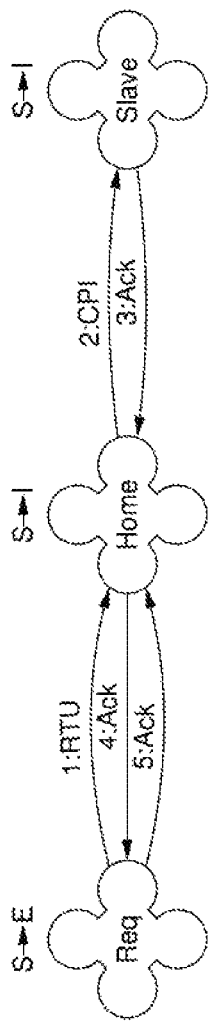

FIG. 2O depicts an embodiment of the cache coherence protocol for a transaction when a requesting node is requesting an upgrade from read-only to read-write access when another importer node has a shared clean (S) copy of the data. Thus, FIG. 2O shows the case of FIG. 2N, except that the requesting node also holds a shared copy of the cache line in this scenario. The requester node indicates that it currently has or previously had a shared copy of the cache line by sending 1:RTU instead of 1:RTO. The home node verifies in the directory that the requester node still has a copy of the cache line; if it has such a copy, the node invalidates any other sharers, updates its own state to I and returns 4:Ack. If the directory indicates that the requester does not have a shared copy, then 1:RTU is treated as 1:RTO. In an alternative embodiment, 1:RTU can be substituted with 1:RTO, however, the result would be less efficient as it would cause unnecessary data transfer.

Victimization

Figure 2P:
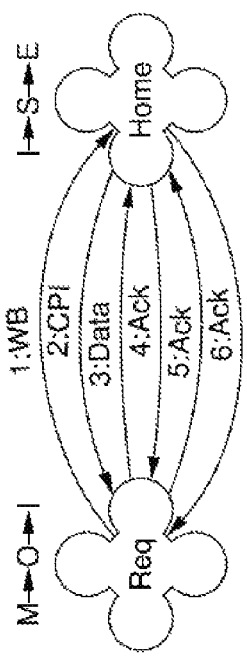

FIG. 2P depicts an embodiment of the cache coherence protocol for a transaction when a requester node with a dirty cache line is evicting the cache line to the home node. First, the requester node issues a 1:WB request to the home node. The home node responds by issuing a 2:CPI message to the requester node. In this case, the requester node is holding dirty data when it receives 2:CPI, so the requester returns 3:Data to the home node. The requester node downgrades its state from M to O to indicate that it is now in a shared dirty state. The cache line at the requester node is still marked dirty in case the 3:Data is lost. Upon receipt of 3:Data at the home node, the home node returns 4:Ack to the requester node as an acknowledgement to the 3:Data provided in response to the 2:CPI request. The home node updates its state to S to indicate it now has a shared clean copy of the data. The requester node, in response to receipt of 4:Ack, invalidates the state of the cache line to I and then sends 5:Ack to the home node. The home node responds to the final CPI 5:Ack with a final WB 6:Ack and updates its state to E to indicate it has an exclusive clean copy of the data. The requester node can distinguish the Ack for the CPI (4:Ack) from the final WB Ack (6:Ack) because the transaction IDs index different scoreboards. From the point of view of the requester node the WB protocol is to issue the WB and await the Ack. The CPI is treated as an independent incoming request.

Figure 2Q:
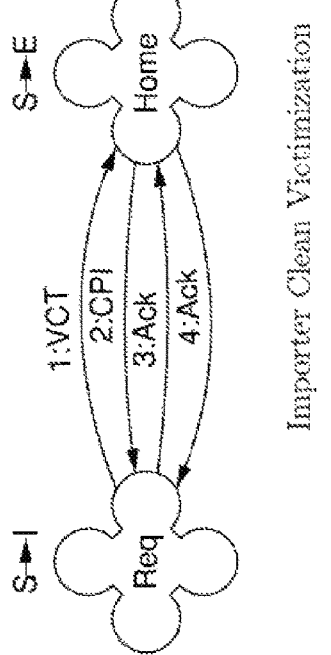

FIG. 2Q depicts an embodiment of the cache coherence protocol for a transaction when a requester node with a clean cache line is evicting the cache line to the home node. First, the requester node issues a 1:VCT request to the home node.

The home node responds by issuing a 2:CPI message to the requester node. In this case, the requester node is holding clean data when it receives 2:CPI, so the requester node simply returns 3:Ack instead of 3:Data to the home node. The requester node downgrades its state to invalid (I). The home node responds to the CPI 3:Ack with a final VCT 4:Ack. The difference between WB in FIG. 2P and VCT in FIG. 2Q is to provide performance improvement. In a WB call, if the directory does not indicate that the requester node is the exclusive holder of the cache line, the home node is required to check for poisoned data before replying. This would be unneeded overhead for a clean victimization, which can be handled by a VCT call instead.

Figure 2R:
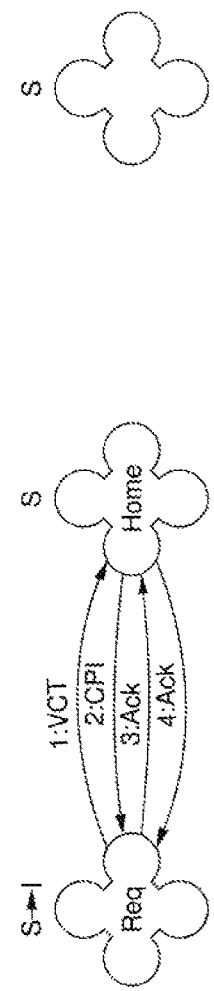

FIG. 2R depicts an embodiment of the cache coherence protocol for a transaction when a requester node with a clean cache line is evicting the cache line to the home node and the data is shared with other importing node(s). The case of FIG. 2R is handled the same as for FIG. 2Q, except that the home node state is not upgraded to E, because the cache line is still shared with other importers.

Figure 2S:
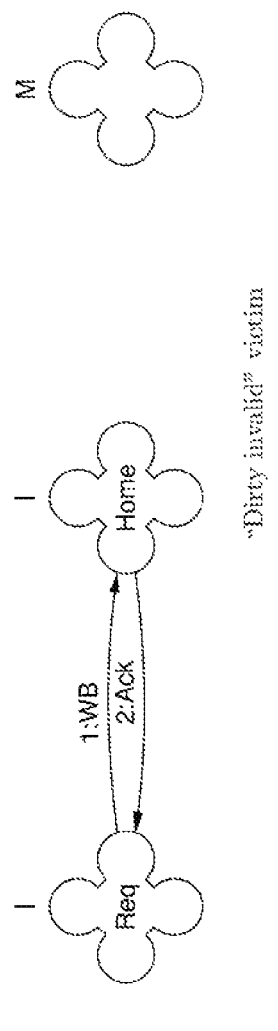

FIG. 2S depicts an embodiment of the cache coherence protocol for a transaction when a requester node with an invalid cache line is evicting the cache line to the home node. This may occur when the cache line was previously invalidated, but too late to prevent the issuing of WB. The requester node issues a 1:WB request to the home node. Because the directory on the home node indicates that the requester no longer holds the cache line, no CPI is issued by the home node. Instead, the home node issues a 2:Ack to the requester node. Handling of the corresponding VCT case is similar. Race conditions, in particular with CMT requests, could result in the victimized cache line being clean when the WB is processed by the home node. The handling of WB then resembles the handling of VCT. Issuing a WB for a clean cache line is permitted, but can be unnecessarily inefficient. It is not permitted to issue a VCT for a dirty cache line. It is therefore not permitted to store to a cache line for which VCT has been issued.

Figure 2T:
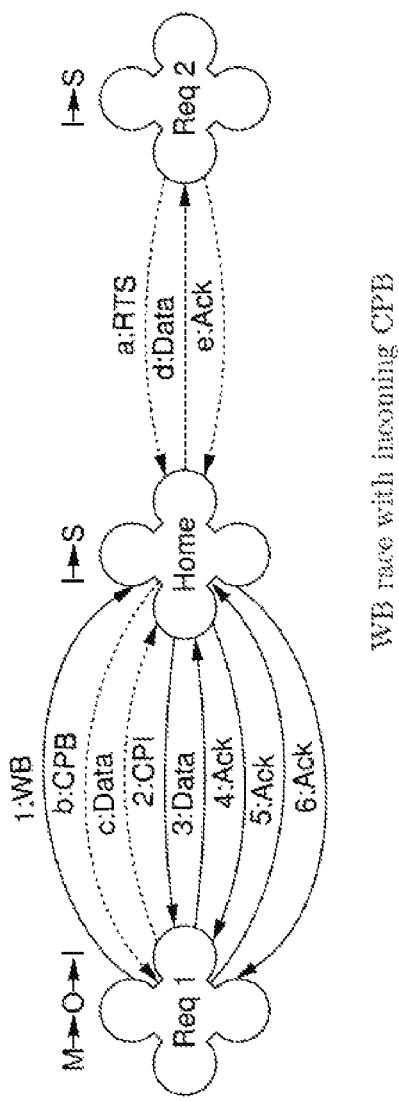

FIG. 2T depicts an embodiment of the cache coherence protocol for a transaction when a requester node with an exclusive dirty cache line sends WB request to the home node and the home node sends an CPB request to the requester node in a race condition. In this depiction, the dotted lines depict the processing of the incoming CPB request. The processing of the 1:WB request is the same as depicted earlier in FIG. 2P, however, in this scenario, the home node is not transitioned to an exclusive clean state. In FIG. 2T, the processing of the second requesting node's a:RTS request is the same as depicted in the requesting node in FIG. 2E. In FIG. 2T, the b:CPB request caused by the a:RTS request has no effect on the 2:CPI that is executed as part of the WB attempt, because the b:CPB leaves the cache line dirty at the requester node. Should the c:Data be lost, the 2:CPI request must not invalidate the data. Consequently, the data is copied twice in the example illustrated in FIG. 2T in c:Data (for the a:RTS request) and in 3:Data (for the 1:WB request).

Figure 2U:
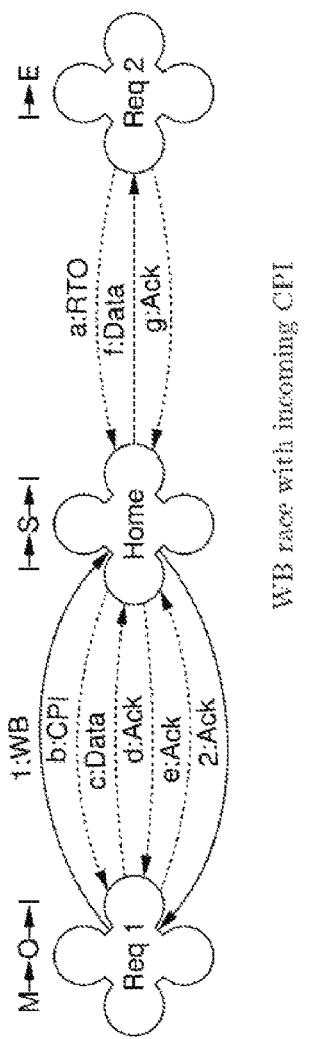

FIG. 2U depicts an embodiment of the cache coherence protocol for a transaction when a requester node with an exclusive dirty cache line sends WB request to the home node and the home node sends a CPI request to the requester node in a race condition. In FIG. 2U, the requester node cannot tell that the b:CPI, which results from the home node processing the a:RTO request before processing the 1:WB request, is not caused by the 1:WB requested. The requester node sees no difference from the case of FIG. 2P.

Committing of Dirty Cache Lines to Home Node

Figure 2V:
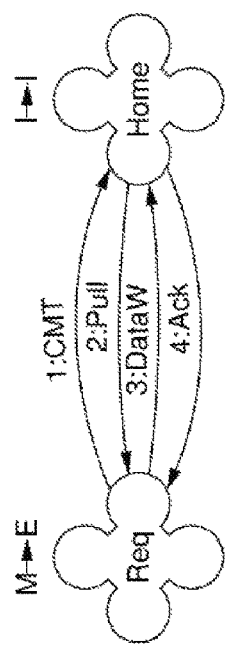

FIG. 2V depicts an embodiment of the cache coherence protocol for a transaction when a requester node with an exclusive dirty cache line initiates a CMT transaction in the normal sequence to commit the store(s) and to clean the cache line. Requester node sends 1:CMT to home node. The home node confirms from the directory that the requester node holds an exclusive copy. The home then sends a 2:Pull response to the requester node. In response to 2:Pull, the requester node sends 3:DataW to the home node and marks its copy of the cache line as tentatively clean with the state E. A DataW message is similar to a Data message, however, a DataW message is handled differently by the transport layer in the case of a lost message, as will be described herein. When the home node receives the data from 3:DataW, it stores the cache line locally in state I. The home node then responds with 4:Ack to the requester node to compete the transaction. Upon receiving 4:Ack, the requester completes the transaction on its end. In an embodiment, the requester node may use a timeout to wait for incoming 4:Ack. If the 4:Ack is not provided before the end of the timeout, the requester node may initiate a new CM request or may invalidate the cache line and send a notification to the storing thread(s).

Figure 2W:
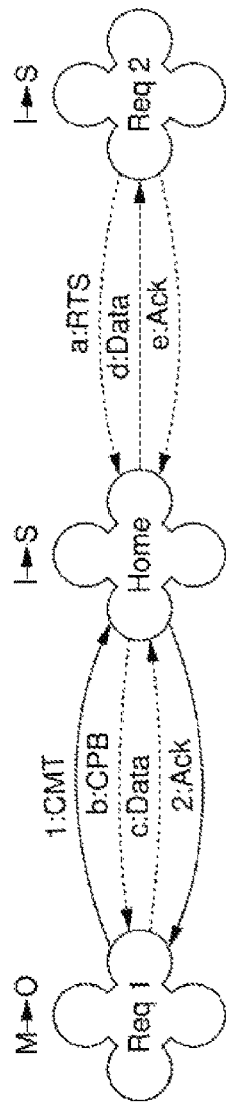

FIG. 2W depicts an embodiment of the cache coherence protocol for a transaction when a requester node with an exclusive dirty cache line initiates a CMT transaction and the requester node receives a CPB in a race condition. In this example, when 1:CMT is processed by the home node, the requester node is no longer the exclusive holder, so an acknowledgement 2:Ack is sent immediately instead of waiting for a Pull and DataW communication as in FIG. 2V. Other race conditions for CMT transactions are handled similarly.

Error Handling

In prior systems that use software-based internode coherence, the vast majority of communication and node errors result in the loss of messages. However, it is possible for messages to arrive late, after the initiating request has timed out. The cache coherence system 100 is thus implemented to be robust against both message loss and message late arrival. A failure occurs when retrying a request does not result in request completion as seen by the requester. The loss of a final response to the responder does not constitute request failure.

In an embodiment, cache coherence system 100 adheres to one or more principles for handling importer request failure (e.g. RTS, RTO, RTU, WB, VCT, and/or CMT failure). An RTS, RTO or RTU request failure (e.g. retry fails) causes the requester node to change the cache line state as if the request had succeeded. The requester node poisons the cache line data. Poisoning causes loads and stores to the failed transaction's address to trap the requesting thread instead of performing the load or store operation. A WB or VCT request failure results in the victimization of the associated cache line and a trap issued to a designated thread. Because there is no record of what threads have modified the cache line, it is not possible to issue a trap to a storing thread. A CMT request failure results in the invalidation of the associated cache line at the requester and the trapping of the storing thread(s).

In an embodiment, cache coherence system 100 follows one or more principles for handling home request failures (e.g. CPB and/or CPI failures). A CPB or CPI request failure (e.g. retry fails) causes the requester to change the cache line state as if the request had succeeded. The requester poisons the cache line data. Poisoning causes loads and stores to the failed transaction's address to trap the requesting thread instead of performing the load or store operation. The requester, being in these cases the home node, also updates the directory as if the request had succeeded. In an embodiment, poisoning requires hardware support in memory and in the processors' caches to store the poisoned indication.

In some embodiments, the transport layer may deliver requests late such that the requester has timed out by the time it receives any response. Although the requester can determine that any response is stale, for example, by looking at its sequence number, the responder cannot determine that the request is stale, because the responder has no role in allocating the sequence number. The cache coherence protocol is designed such that no request can cause irreparable state changes before checking that its sequence number is still current via a response to the requester. For this reason, there is no INV invalidating request and no CPC cleaning copyback request implemented in the present system. Additionally, CPI only invalidates clean data or copies back dirty data before sequence number checking. Both operations are transparently recoverable if the CPI's sequence number had expired.

Stale Data and Ack responses received by the requester result in a Nack response to the responder. This Nack clears any active responder scoreboard entry for the stale request so that other requests for the same cache line can be processed by the responder. Allowing the responder scoreboard entry to remain active until timing out can result in the requester timing out on other requests to the same cache line, thus bringing forward progress to a halt.

Without coherence protocol forward progress, it is difficult or impossible to maintain forward progress of the system. To that end if a coherence request for read-only or read-write access has to be abandoned due to a communication breakdown, then the requested access rights are granted, thereby allowing any dependent load instruction to retire or store to exit the store buffer, but the cached data is poisoned. The poisoning is detected by the load or store hardware, causing a trap and suppressing any effect of the load or store. Hardware is responsible for poisoning and suppressing the load or store; software takes over after any trap.

To prevent deadlock, any load instruction to the cache line retires (trapping the issuing thread rather than loading) and any store exits the store buffer (trapping the issuing thread without storing).

Cache Coherence Protocol Retry

Figure 2X:
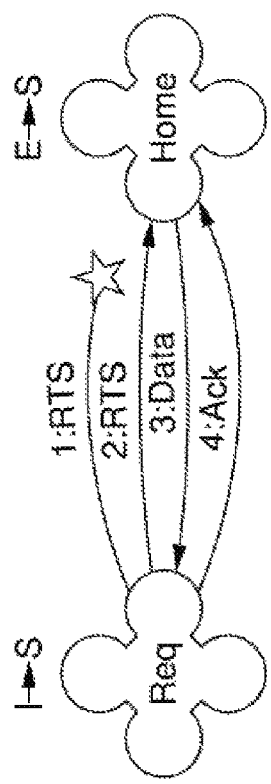

FIG. 2X depicts an embodiment of the cache coherence protocol for a lost RTS message and retry. FIG. 2X shows the case of FIG. 2C, but with the 1:RTS message being lost in transmission. Thus, in FIG. 2X, the 1:RTS is retried as 2:RTS. All messages carry a sequence number which is incremented upon retry, thus the sequence number of 2:RTS is incremented.

Figure 2Y:
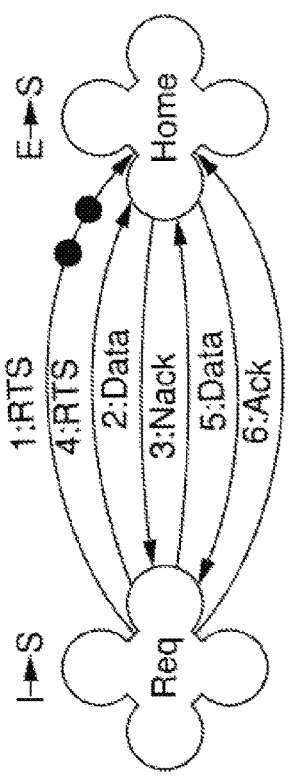

FIG. 2Y depicts an embodiment of the cache coherence protocol for a delayed RTS message and retry. FIG. 2Y shows the case of FIG. 2C, but with the 1:RTS message being delayed in transmission, as indicated by the two black dots. The requester node times out and retries the RTS as 4:RTS, but by the time 4:RTS arrives at the home node, the home node is occupied processing 1:RTS, to which it responds with 2:Data. When 2:Data arrives at the requester, the sequence number does not match any outstanding transaction, so the requester responds with 3:Nack. When the home node receives the 3:Nack, it clears the scoreboard entry for 1:RTS. Without clearing the scoreboard entry in response to 3:Nack, the home node would need to time out, thus causing 4:RTS and all subsequent retries to time out. The home node, after clearing the scoreboard entry, then proceeds with the processing of 4:RTS, which completes normally with 5:Data and 6:Ack.

Figure 2Z:
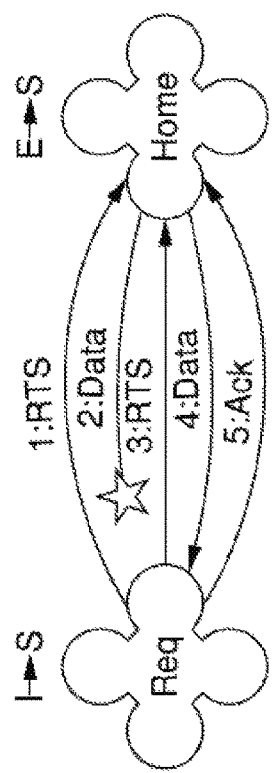
Figure 2A:
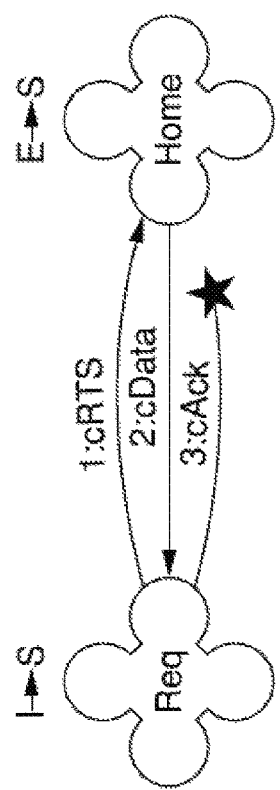
Figure 2A:
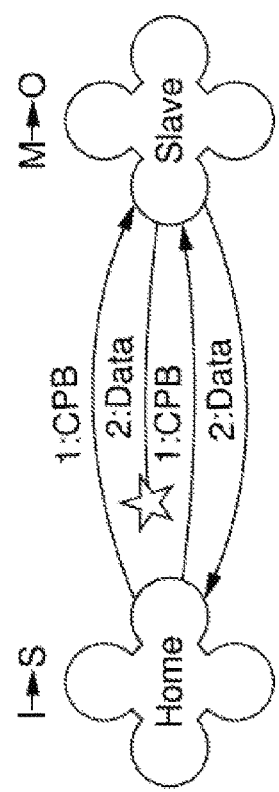
Figure 2A:
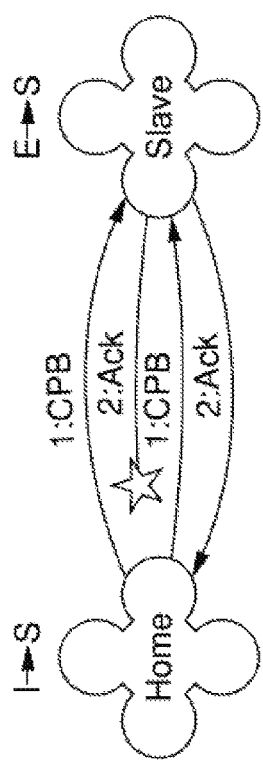
Figure 2A:
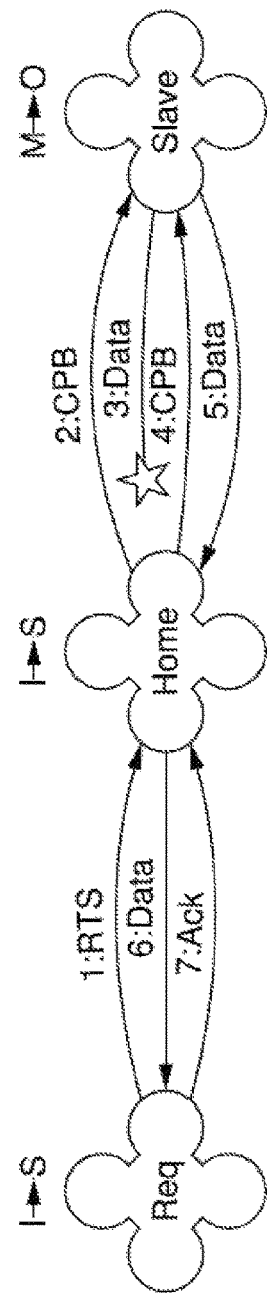
Figure 2A:
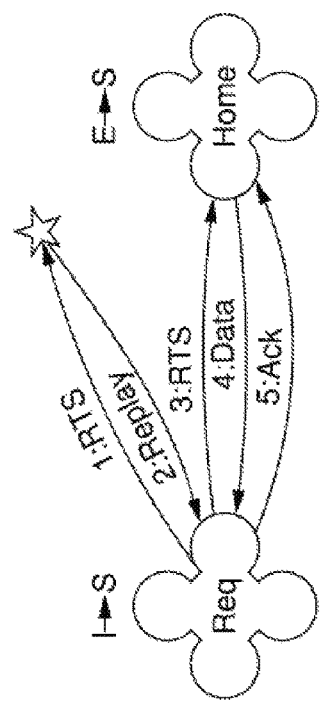
Figure 2A:
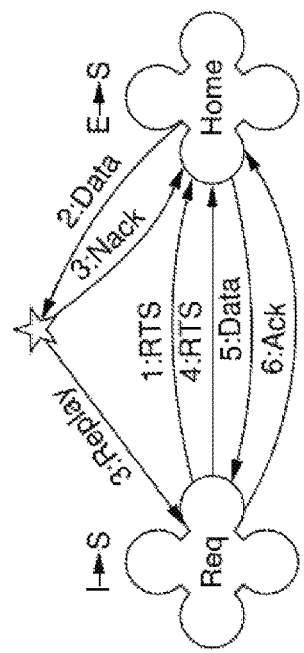
Figure 2A:
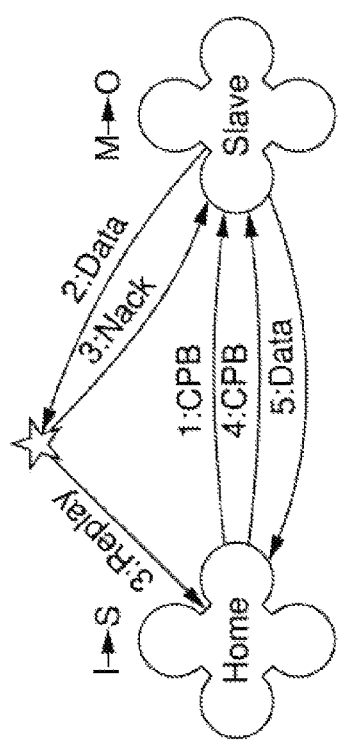
Figure 2A:
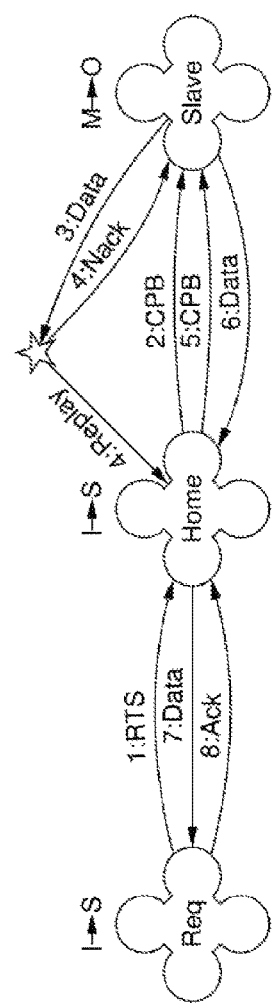
Figure 2A:
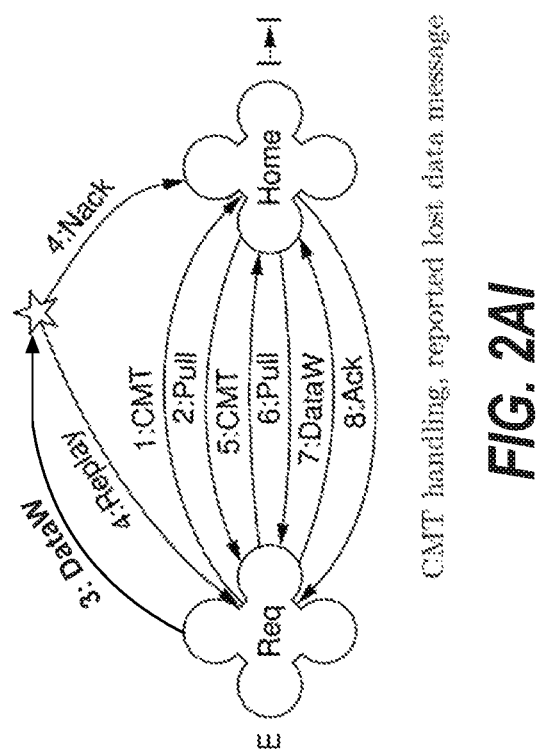

FIG. 2Z depicts an embodiment of the cache coherence protocol for a lost data message and retry. FIG. 2Z shows the case of FIG. 2C, but with the 2:Data message being lost in transmission. The transaction is retried from the beginning when requester node sends 3:RTS. On the second attempt, the requester node sees that the home node's state and directory have already been updated, but this does not affect the transaction's outcome.

FIG. 2AA depicts an embodiment of the cache coherence protocol for a lost Ack message. FIG. 2AA shows the case of FIG. 2C, but with the 3:Ack message being dropped. In this case the transaction has otherwise completed successfully. After timing out, the home node marks the transaction as complete. If the transport layer detects the lost Ack response, the transport layer can resend the Ack to the home node. The cache coherence protocol would not see the lost Ack message. In an embodiment, for this home node timeout to not adversely affect subsequent transactions to the same cache line, it is required that the timeout at the home node be no less than the timeout at the requester node. Any coherence request from the home node to the requester node after a home node timeout arrives at the requester node after the requester node has also timed out. This ensures that incoming requests to an importer during an active outgoing request for the same cache line are processed at the home node before the outgoing request.

FIG. 2AB depicts an embodiment of the cache coherence protocol for a lost Data message for a CPB and retry. FIG. 2AB shows the case of FIG. 2A where the 2:Data message is dropped. In the example of FIG. 2AB, the 1:CPB is retried by the home node.

FIG. 2AC depicts an embodiment of the cache coherence protocol for a lost Ack message for a CPB and retry. FIG. 2AC shows the case of FIG. 2A where the 2:Ack message is dropped. In the example of FIG. 2AB, the 1:CPB is retried by the home node.

FIG. 2AD depicts an embodiment of the cache coherence protocol for a lost Data message for a secondary CPB and retry. FIG. 2AD shows the case of FIG. 2E, but with 3:Data being dropped in the secondary request. The 2:CPB is retried by the home node as 4:CPB. The requester node does not retry and is unaware of the CPB retry, provided that the retry succeeds. If the retry does not succeed, poisoned data is supplied to the requester (not shown in FIG. 2AD). In an embodiment, the timeout for the home node requests is less than the timeout for the importer requests, thereby allowing multiple retries at the home node before a requesting importer times out.

Message Loss Detected by Transport Layer

In the prior examples shown in FIGS. 2X to 2AD message loss is detected at the protocol layer and any lost message resulted in a protocol requester timeout before any failed request could be retried. If the transport layer is reliable, then these failures are very rare. However, if the transport layer allows routine transmission errors to result in lost messages, then the timeouts may become unacceptably frequent. If such an unreliable transport layer can communicate message loss to the protocol layer, then a request can be retried before timing out, thus greatly reducing the impact of transmission losses.

The bookkeeping required by the transport layer is such that it is simpler for the transport layer to internally retry non-data-carrying responses rather than notifying the protocol layer to retry the original request. The following examples therefore only cover the loss of requests and data-carrying responses.

FIG. 2AE depicts an embodiment of the cache coherence protocol for a lost RTS message detected by the transport layer and retry. FIG. 2AE shows the case of FIG. 2X, but with the transport layer detecting the loss of the 1:RTS message. The transport layer sends 2:Replay to the requester node, which retries the 3:RTS immediately.

FIG. 2AF depicts an embodiment of the cache coherence protocol for a lost Data message for an RTS detected by the transport layer and retry. FIG. 2AF shows the case of FIG. 2Z, but with the transport layer detecting the loss of the 2:Data message. The transport layer sends 3:Replay to the requester node and 3:Nack to the home node. The requester node retries the RTS immediately as 4:RTS and the home node clears the scoreboard entry handling 1:RTS, so it can process the 4:RTS retry. The 3:Nack message ensures forward progress. Without the 3:Nack message, the 4:RTS request would have to wait for the home node's handling of the 1:RTS request to time out, and thus the requester node would likely time out as well, thereby bringing forward progress to a halt for subsequent retries.

FIG. 2AG depicts an embodiment of the cache coherence protocol for a lost CPB data message detected by the transport layer and retry. FIG. 2AG shows the case of FIG. 2A, but with the transport layer detecting the loss of the 2:Data message. The transport layer sends 3:Replay to the requester node and 3:Nack to the home node. The requester node retries the CPB immediately as 4:CPB and the home node clears the scoreboard entry handling 1:CPB, so it can process the 4:CPB retry. The 3:Nack message ensures forward progress.

FIG. 2AH depicts an embodiment of the cache coherence protocol for a lost CPB data message detected by the transport layer and retry in the context of a secondary CPB. FIG. 2AH shows the case of FIG. 2AD, but with the transport layer detecting the data message loss for 3:Data and issuing 4:Replay to the home node and 4:Nack to the slave node. The home node retries the CPB immediately as 5:CPB.

FIG. 2AI depicts an embodiment of the cache coherence protocol for a lost DataW message during a CMT transaction detected by the transport layer and retry. FIG. 2AI shows the situation of FIG. 2V, but the 3:DataW message is lost on the first attempt. The transport layer detects the loss, sending 4:Replay to the requester node and 4:Nack to the home node. Upon receiving 4:Replay the requester node retries the CMT as 5:CMT. Upon receiving Nack, the node clears the scoreboard entry that was handling the 1:CMT so that it can process the 5:CMT request. In this scenario, when the transport layer detects a lost DataW, it sends Replay to the source of the DataW and Nack to the destination of the DataW. This is in contrast to lost Data, where a Replay request is sent to the destination and Nack to the source. The distinction between Data and DataW is solely for controlling the transport layer notification upon message loss.

Transport Protocol

A transport layer is composed of links and switches. A link connects between two end points, where each end point can be a switch port or a node port. Switches are implemented to route messages towards a destination node. Returning to FIG. 1, the transport layer may be implemented across link controllers 160A, 160B, 160C and fabric 170.

Cache coherence system 100 imposes no ordering requirements between messages, thus the transport layer may be configured to dynamically change the routing of messages over fabric 170. For example, if a switch that is a part of fabric 170 is defective, messages can be routed through fabric 170 around the defective switch.

Transmission errors may occur across the transmission links of a transport layer. In some transport layers, link transmission errors are corrected by the transport layer as they occur by retrying the message transmission. For example, a transport layer may perform link-level retry. In link-level retry, the transport layer may protect transmitted messages with cyclic redundancy codes (CRC) and may retry transmission of a message upon detecting an unexpected CRC error. This retrying is most easily performed per-link level, because on a given link transmission is between two fixed end points. Such a transport layer only exposes the coherence protocol to failures (i.e. broken hardware, such as power failure to a switch) rather than routine transmission errors.

In another embodiment, a transport layer may support lossy transmission. In lossy transmission, the transport layer, upon detecting a CRC error, may drop the packets. Cache coherence system 100 mitigates the effects of such lossy transmission, by implementing a scheme for end-to-end retry over a lossy transmission fabric. By implementing this lossy transmission mitigation at the transport layer, instead of at the coherence protocol layer, the transport layer can perform message retries via link controllers 160A, 160B, 160C instead of the COUs managing all message retries. This helps to alleviate some of the load from the COUs, as the link controllers 160A, 160B, 160C can partially handle the load of managing message retries over a lossy fabric 170.

Thus, in an embodiment, cache coherence system 100 may include a transport layer that provides end-to-end retry over a lossy communication fabric 170. Fabric 170 may maintain message order between any two end points (e.g. node link controllers) for a given route through intermediate switches of the fabric 170 on a given virtual lane. A virtual lane is a route of travel between two nodes over fabric 170. Thus, in an embodiment, messages in fabric 170 may be delivered in order or not at all.

Fabric 170 may include multiple routes of travel between two nodes, where each route of travel is a different virtual lane. To avoid single points of failure, fabric 170 may include multiple redundant routes between any two nodes in the system. Messages are sent from a sourcing node to a destination node along a route. For each virtual lane, nodes 110A, 110B, and 110C may maintain tracking data for every message sent over fabric 170 by the node. This tracking data may be managed by link controllers, 160A, 160B, and 160C, respectively. Tracking data may include data for one or more of the following: message type (e.g. Request, Data, DataW, Ack, Nack, or Pull), source TID (STID), destination node ID (DNID), destination TID (DTID), route through fabric 170, protocol sequence number (SEQ), and transport sequence number (TSN). The TSN is generated by the link controller at the source node. At the link controller, there is one TSN counter for each route-destination-virtual lane triple. The TSN increments for each message sent to a given destination over a given route on a given virtual lane.

In an embodiment, each node may further store, at its link controller, records for each route, source, and virtual lane, the sequence number of the last received message. These tracking records may be used to mitigate loss transmission.

Figure 3:
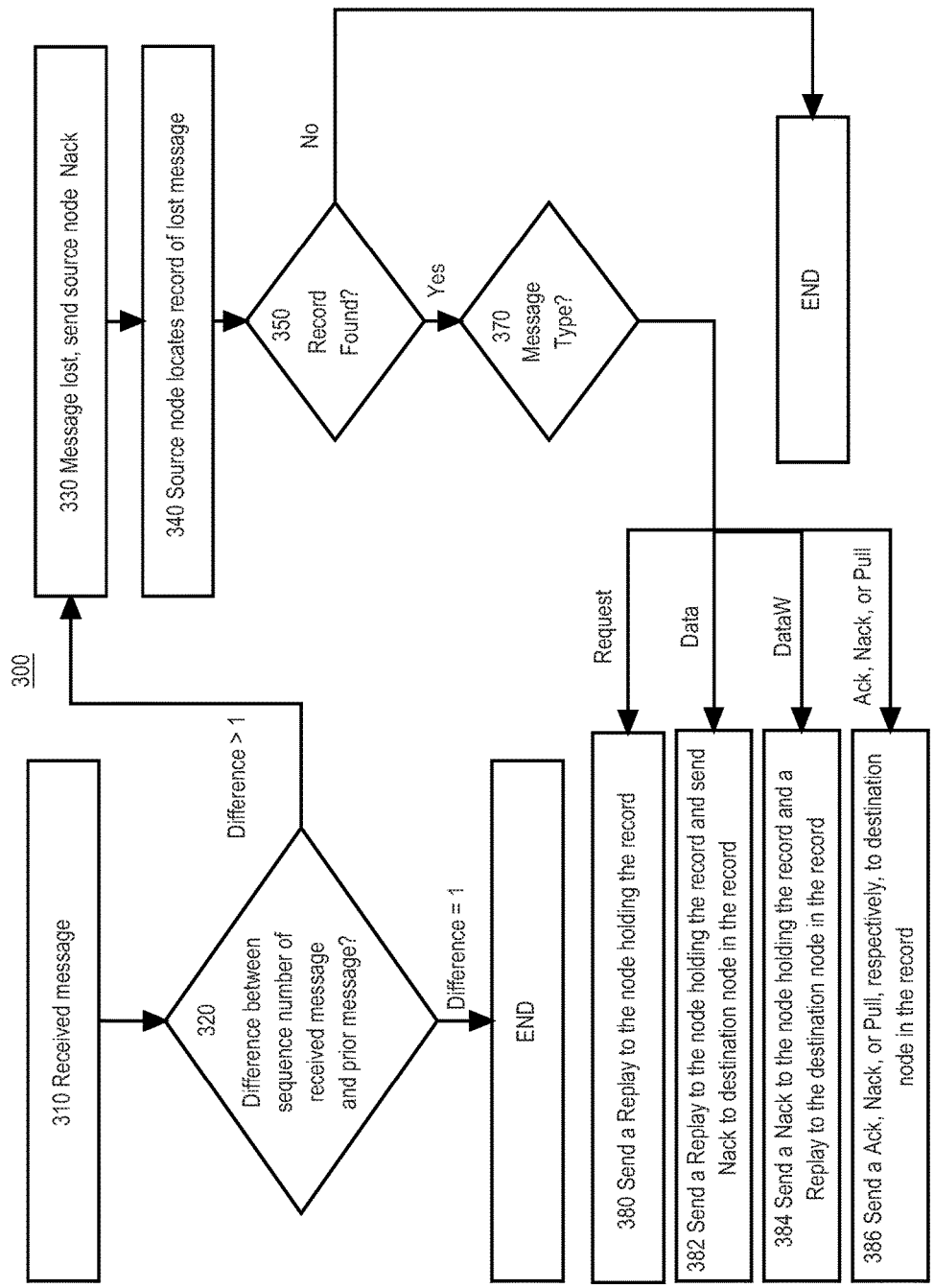
FIG. 3 illustrates an example flow diagram for a process for mitigating loss transmission via a transport layer.

FIG. 3 illustrates an example flow diagram for a process 300 for mitigating loss transmission by using a transport layer, according to one embodiment. In step 310, a message is received at a node. The process 300 may then proceed to step 320.

In step 320, the sequence number of the received message is compared to the recorded sequence number of the last received message, as stored in the data tracking record. If the difference between sequence numbers is equal to one, then no intervening messages have been lost and it can be determined that the received message is the next expected message. The process 300 may end. If the difference between sequence numbers is greater than 1, then the process 300 may proceed to step 330.

In step 330, a lost message has been detected. Therefore, a Nack message that includes the lost sequence number and route is sent to the source node for further processing. In an embodiment, this Nack message may be sent by the transport layer. The process 300 may then proceed to step 340.

In step 340, the sourcing node, in response to receiving the Nack message in step 330, attempts to locate a record for the lost message, by looking through its local tracking data for a message that was previously sent by the sourcing node to the source of the Nack message with the Nack message's sequence number. The process 300 then proceeds to step 350.

In step 350, the process 300 determines if the record was found. If the record was not found, then the process 300 ends. If the record was found, then the process 300 proceeds to step 370.

In step 370, the process 300 determines the message type of the record. If the message type is a Request, the process 300 proceeds to step 380. If the message type is a Data message, the process 300 proceeds to step 382. If the message type is a DataW message, the process 300 proceeds to step 384. If the message type is a Ack, Nack, or Pull message, the process 300 proceeds to step 386.

In step 380, a Replay message is sent to the node holding the record. The process 300 may then end.

In step 382, a Replay message is sent to the node holding the record and a Nack message is sent to the destination node identified in the record. The process 300 may then end.

In step 384, a Nack message is sent to the node holding the record and a Replay message is sent to the destination node in the record. The process 300 may then end.

In step 386, an Ack, Nack, or Pull message is sent to the destination node identified in the record, based on the message type identified in the record. The process 300 may then end.

A node may then process a received Nack message by implementing the following: the node, at the link controller, finds a record of a sent message to the source of the Nack message with the Nack message's sequence number and route in the tracking data. If no such record is found, the node will not do anything, as it is possible that the record may have been overwritten.

Late Message Handling

To support a transport layer that might deliver messages with a sufficiently large delay to cause requester or responder timeout, it is necessary to detect the delivery of stale messages from the timed out request. This is done by attaching a sequence number or sequence number to each message. Sequence numbers are not needed for networks that guarantee for each message either to deliver it in a timely manner or to discard it.

Each scoreboard has an associated request sequence number. Whenever a request-generating transition occurs, the sequence number is incremented. The initial sequence number is chosen to be sufficiently large that by the time a sequence number is reused, no messages from requests with that sequence number initiated will still exist in the transport layer. In another embodiment, a pseudorandom binary sequence generator (PRBS) could be used instead of incrementing the sequence number.

Because sequence numbers are generated by the requester node, upon receiving a request, the responder node cannot tell whether or not the request is stale. The protocol must therefore be designed such that no request causes irreparable damage before any response's sequence number is verified by requester. The responder node uses the requester's sequence number, the requester node ID and the requester TID to determine whether further responses it may receive are stale. In some scenarios, some requests initiate the exchange of multiple responses between the requester and responder.

Responses are determined to not be stale because: (a) for a requester node, the sequence number of any received response matches the sequence number in the receiver node's scoreboard entry indexed by the destination TID in the message and (b) for a responder node, the sequence number, requester TID, and requester node ID matches the sequence number, requester node ID and the requester TID in the receiver's scoreboard entry indexed by the destination TID in the message.

In the case of a failed Data or DataW message, the transport layer generates a Replay and a Nack. In the case of a failed Data message, the transport layer sends the Replay message to the destination of the Data message and the transport layer sends the Nack to the source of the Data message. In the case of a failed DataW message, the transport layer sends the Replay message to the source of the DataW message and the transport layer sends the Nack to the destination of the DataW message. The TIDs in the Replay and Nack are arranged so that the messages appear to come from the responder and requester, respectively.

Node Loss

Detecting of the loss of an entire node in cache coherence system 100 may be challenging, compared to the loss of a single packet or late delivery of a packet. In an embodiment, a node may be configured to perform heartbeat detection of the status of other nodes in a cluster. A lost heartbeat for a particular node indicates that the particular node has been lost. Thus, all memory locations exported by the particular node, as well as all uncommitted stores performed by the particular node on imported memory locations would be lost.

Example Protocol Layer—Finite State Machines

The protocol layer for implementing internode cache coherence may be represented as finite state machines (FSM) of the home node and/or importing node. The tables in FIGS. 5A-5R illustrate transition rules for the FSMs for the importing nodes and for the home node of each cache line for an example protocol that supports both packet loss and late delivery by the transport layer. Thus, the tables FIGS. 5A-5R may be used in conjunction with the FIGS. 2A-2DAI to implement an example protocol layer for internode cache coherence, according to one embodiment. The following terminology may be used across all of FIGS. 5A-5R:

"Replay" indicates that the transport layer indicates that the request or a returned message has been lost and that the request should be retried. In this case the retried request does not need a new sequence number.

"Retry" indicates that the request has timed out and is being retried. Because messages associated with the timed-out request could still be in the network, the retried request must carry a new sequence number. "Retry" is only used for a requester.

"Abandon" indicates that the request has timed out and that no further retries are being made. "Abandon" is only used for a requester.

"Timeout" indicates that a response to a responder has timed out. "Timeout" is only used for a responder.

"/P" attached to a cache line state or data messages indicates that the data is marked as poisoned. Poisoning causes loads and stores accessing that cache line to trap.

"/T" attached to a cache line state indicates that an error-reporting interrupt is sent to a thread, which may be the initiating thread or an error-steering thread.

FIG. 5A illustrates an example of the transition rules for when an importing node needs to obtain read access to a cache line. In this example, the importing node issues an RTS request to the home node of the cache line. The home node returns data to the importing node.

FIG. 5B illustrates an example of the transition rules for when an importing node needs to obtain read-write access to a cache line for which it currently has no access rights, it issues an RTO request to the home node of the cache line. The home node returns data to the importer. When an importing node needs to obtain read-write access to a cache line for which it currently has read-only access, it issues an RTU request to the home node of the cache line. The home node returns an acknowledgment to the importer, provided the access rights are still held when the request is processed.

FIG. 5C illustrates am example of the transition rules for when a node issues a VCT request to evict a clean cache line. It is used to keep the directory at the home node synchronized with the node's cache. It can be more efficient than using silent victimization. The detailed VCT transitions are shown in FIG. 5C, however, the actual change of cache line state is a result of a received CPI (not depicted in FIG. 5C).

FIG. 5D illustrates an example of the transition rules for when a node issues a WB request to evict a dirty cache line. The detailed WB transitions are shown in FIG. 5D. However, the actual change of cache line state and transfer of the dirty data is a result of a received CPI, so the state change is not described in FIG. 5D. FIG. 5D introduces HF ("Home Filter"). If a CMT or WB from importing node home processor X fails to a specific home processor Y, then no further CMTs are sent from X to Y and; any requests to send such CMTs are rejected. This is to ensure that all failed commits are reported to the storing strand, even at the cost of failing commits that could succeed. Initially the HF state is "Open".

FIG. 5E illustrates an example of the transition rules for when a node issues a CMT request. To mitigate the effect of node failure, dirty cache lines (modified by stores) can be propagated back to the home with a CMT request, so that the stores are not lost in the event of failure of the storing node or of communication failure between the storing node and the home.

Some actions at the importer change state without sending a request. For example, FIG. 5F illustrates an example of the transition rules for when an importing node silently invalidates any clean any clean imported cache line for which it does not have an outstanding request. This may be used occasionally for handling rare corner cases or used instead of sending VCT. Similarly, FIG. 5G illustrates an example of the transition rules for when an importing node that is storing to an imported clean cache line modifies the cache line data and transitions the cache line state from E to M. Storing to an imported dirty cache line (in state M) just modifies the cache line data. Storing is only performed if there is no outstanding RTS, RTO, WB or VCT request to the cache line; storing can be performed during a CMT transaction.

All requests received by an importing node are sent by the home node. To avoid deadlock, the importer processes these requests regardless of whether the importer itself has a pending request for the cache line. FIG. 5H illustrates an example of the transition rules for the effect of a CPB. If the cache line is dirty Data is returned, otherwise Ack is returned. Any rights to read the cache line are retained. A dirty cache line remains dirty to allow the CPB to be retried if the Data message is lost.

FIG. 5I illustrates an example of the transition rules for the effect of a CPI, which is sent by the home node when another node requires read-write access to the cache line. Initially, if the cache line is dirty, Data is returned, otherwise Ack is returned and the cache line is invalidated. Any rights to read a dirty cache line are retained. A dirty cache line remains dirty to allow the CPI to be retried if the Data message is lost. Receiving a subsequent Ack indicates that the Data message has been delivered to the home node, therefore the cache line is invalidated and an Ack returned to the home node.

The home node may issue requests on its own behalf for obtaining read-only or read-write access rights. These same requests are also issued as secondary requests for handling requests from importing nodes. In these examples, the Current State Directory column contains the current coherence directory state. For the purposes of the following transition tables, the following states may be used for the Current State Directory column:

"E" indicates that the home node has an exclusive writeable copy of the cache line.

"S" indicates that the cache line is shared between the home node and one or more importing notes.

"I" indicates that the home node's copy is marked invalid. An importing node has exclusive access.

"$E_R$" indicates that the requesting node has an exclusive writeable copy of the cache line.

"$S_R$" indicates that the cache line is shared solely between requesting node and home node.

"$S_R+$" indicates that the cache line is shared between requesting node, the home node and at least one other node.

Additionally, Next State Directory column describes the next coherence directory state. For purposes of the following transition tables, the following states may be used for the Next State Directory Column:

"+R" will add requester and home node to directory.

"−R" will remove requester from directory and add home node to directory.

"−X" will remove responding slave from directory.

"$E_R$" indicates that the requester node has an exclusive writeable copy of the cache line.

FIG. 5J illustrates an example of the transition rules for when a CPB is issued by the home node to obtain read-only access. When the home has no access, the directory indicates that an importer has sole access to the cache line. Receiving Ack indicates that any copy held by the importer is clean, so the home can use its own copy (despite being currently marked as invalid).

FIG. 5K illustrates an example of the transition rules for when a CPI is issued by the home to obtain read-write access. If the home has no access, the directory indicates that an importer has sole access to the cache line. CPI is sent to all importers indicated in the directory as holding the cache line. An Ack is received from each such importer unless it holds a dirty copy, in which case a Data message is received.

After receiving Data, the home returns Ack to the importer, which then responds with Ack.

Requests received by the home node from an importing node fall into three classes: requests for access rights (RTS, RTO and RTU), requests to evict a cache line (VCT and WB), and Requests to commit a modified cache line to the home (CMT). Requests for access rights may trigger secondary transactions from the home node to one or more other importing nodes. Requests for eviction usually trigger a secondary request to the requesting importer.

FIG. 5L illustrates an example of the transition rules for a RTS.

FIG. 5M illustrates an example of the transition rules for a RTO. If the directory indicates that the requester holds the cache line, then all other holding nodes (including the home node) are invalidated and Ack is returned to the requester. If the directory indicates that the requester does not hold the cache line, then RTU is handled as for RTO.

FIG. 5N illustrates an example of the transition rules for a RTU.

FIG. 5O illustrates an example of the transition rules for a VCT. A VCT is received by the home when an importing node wishes to evict a cache line while keeping the directory synchronized.

FIG. 5P. illustrates an example of the transition rules for a home node handling of a WB received by an importing node.

FIG. 5Q illustrates an example of the transition rules for a home node handling of a CMT. If the requester is indicated as having an exclusive copy, then a Pull response is sent to the requester, otherwise, unless the data is poisoned at the home, Ack is sent. In response to the Pull, DataW arrives if the data was actually dirty at the requester.

FIG. 5R illustrates an example of the transition rules when stale messages occur in the context of Retry, Abandon, and Timeout. A stale message is defined as a message whose sequence number does not match with the sequence number in the receiver's scoreboard entry. Recall that stale requests are always handled as if they are fresh (the responder cannot determine that they are stale). The purpose of issuing Nack is to clear the responder's scoreboard, in case the responder has neither completed nor timed out. Nack is only sent by a requester.

When a node detects a stale response, there is no associated FSM, because no scoreboard entry matches the response's TID(s) and sequence number.

Implementation Mechanisms—Hardware Overview

Figure 4:
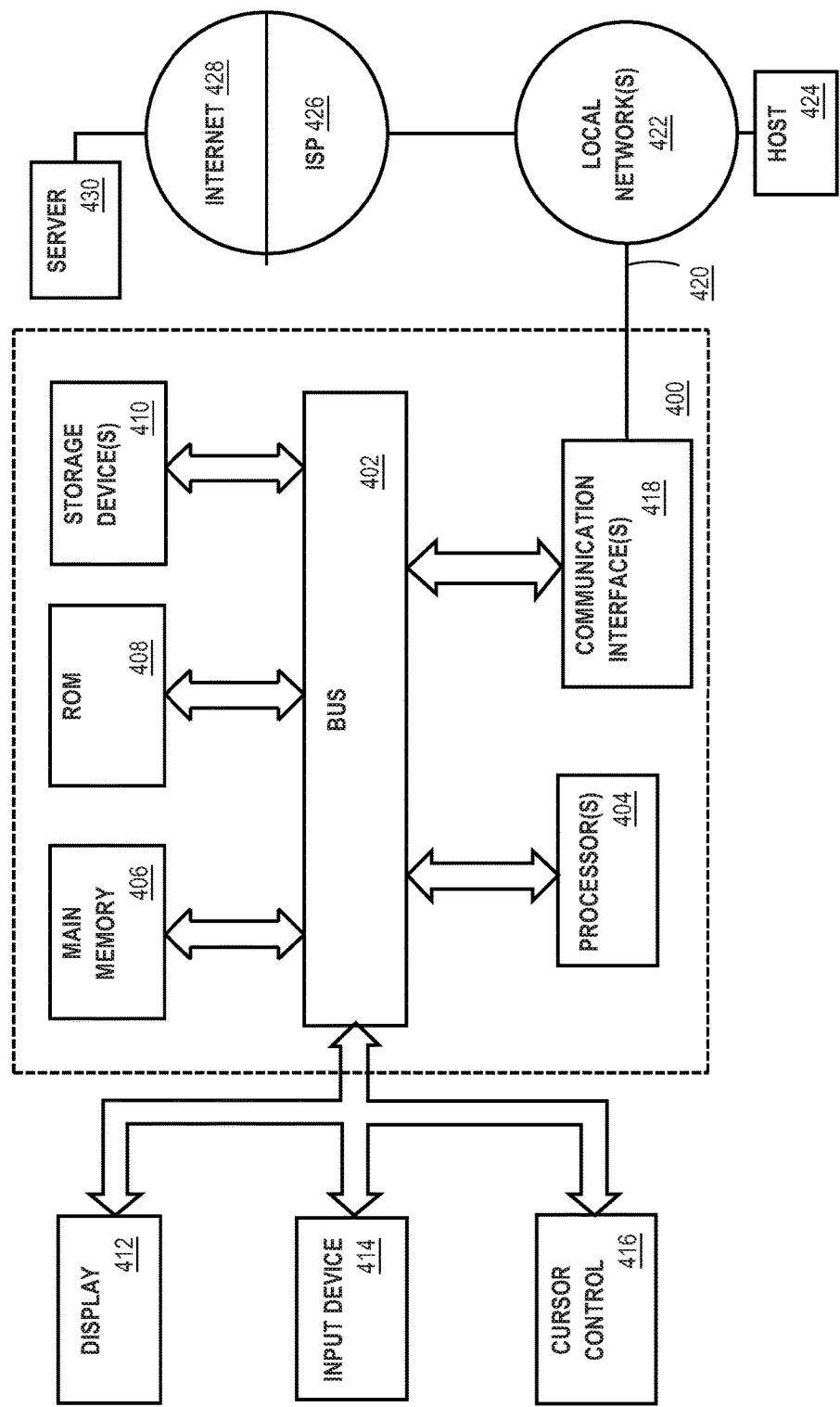
FIG. 4 is a block diagram of a computing device in which the example embodiment(s) of the present invention may be embodied.

Referring now to FIG. 4, it is a block diagram that illustrates a computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or electromagnetic waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
   sending, by a first hardware unit of a first plurality of hardware units on a requester node of a cluster of nodes, a first request for particular data to a home node of the cluster of nodes, wherein the first request comprises a first sequence number;

wherein each node of the cluster of nodes comprises a plurality of hardware units wherein each hardware unit of the plurality of hardware units is coupled to a particular memory and a particular cache and each particular hardware unit of the plurality of hardware units is configured as a cache controller of the particular memory and the particular cache;

determining, by the first hardware unit, that no data message has been received by the first hardware unit from the home node in a specified time out period for the first request for particular data;

based on the determining that no data message has been received, sending, by the first hardware unit on the requester node, a second request for the particular data to the home node, wherein the second request comprises a second sequence number;

receiving, by the first hardware unit on the requester node, a first data message containing the particular data from the home node;

sending, by the first hardware unit on the requester node, an acknowledgement message to the home node;

storing at the requester node, a plurality of entries, wherein each entry of the plurality of entries comprises a transaction identifier, sequence number, source node identifier, destination node identifier, and cache line address; and storing within the plurality of entries, based on the sending of the first request for particular data, by the first hardware unit, a first entry for the first request for particular data wherein the first entry comprises a first transaction identifier, the first sequence number, a first source node identifier that identifies the requester node, a first destination node identifier that identifies the home node, and a first cache line address that identifies the particular data.

2. The method of claim 1, further comprising:
storing a first cache line state of the particular data in a first directory on the requester node; and
storing a second cache line state of the particular data in a second directory on the home node.

3. The method of claim 2, further comprising:
in response to receiving the data message at the requester node, the first hardware unit updating the first cache line state of the particular data on the requester node to a shared clean state; and
in response to receiving the acknowledgement message at a second hardware unit on the home node, the second hardware unit updating the second cache line state of the particular data on the home node to a shared clean state.

4. The method of claim 1, further comprising:
storing within the plurality of entries, based on the sending of the second request for the particular data, by the first hardware unit, a second entry for the first request for particular data, wherein the second entry comprises the first transaction identifier, another sequence number, the first source node identifier that identifies the requester node, the first destination node identifier that identifies the home node, and the first cache line address.

5. The method of claim 4, further comprising:
in response to receiving the first data message containing the particular data from the home node, deleting the first entry and the second entry.

6. A first node for use in a distributed computing system, the first node comprising:
one or more hardware units, wherein each hardware unit of the one or more hardware units comprises one or more processors, registers, content-addressable memories, and/or other computer-implemented hardware circuitry;

wherein each hardware unit of the one or more hardware units is coupled to a particular memory and a particular cache and each particular hardware unit of the one or more hardware units is configured as a cache controller of the particular memory and the particular cache;

wherein a first hardware unit, of the one or more hardware units, is configured to:
send a first request for particular data to a second node, wherein the first request comprises a first sequence number;

determine that no data message has been received by the first hardware unit from the second node in a specified time out period for the first request for particular data;

based on the determination that no data message has been received, send, by the first hardware unit, a second request for the particular data to the second node, wherein the second request comprises a second sequence number;

receive a first data message containing the particular data from the second node;

send an acknowledgement message to the second node;

store a plurality of entries, wherein each entry of the plurality of entries comprises a transaction identifier, sequence number, source node identifier, destination node identifier and cache line address; and store within said plurality of entries, based on the sending of the first request for particular data, a first entry the first request for particular data, wherein the first entry comprises a first transaction identifier, the first sequence number, a first source node identifier that identifies the requester node, a first destination node identifier that identifies the first node, and a first cache line address that identifies the particular data.

7. The first node of claim 6, wherein the first hardware unit is further configured to:
store a first cache line state of the particular data in a first directory on the first node.

8. The first node of claim 7, wherein the first hardware unit is further configured to:
in response to receiving the data message at the requester node, the first hardware unit updating the first cache line state of the particular data on the first node to a shared clean state.

9. The first node of claim 6, wherein the first hardware unit is further configured to:
store within the plurality of entries, based on the sending of the second request for particular data, a second entry for the first request for particular data, wherein the second entry comprises the first transaction identifier, another sequence number, the first source node identifier that identifies the requester node, the first destination node identifier that identifies the home node, and the first cache line address.

10. The first node of claim 9, wherein the first hardware unit is further configured to:
in response to receiving the first data message containing the particular data from the home node, delete the first entry and the second entry from the requester scoreboard.

11. One or more non-transitory computer-readable storage media storing sequences of instructions, which when executed by one or more processors, cause:
- sending, by a first hardware unit of a first plurality of hardware units on a requester node of a cluster of nodes, a first request for particular data to a home node of the cluster of nodes, wherein the first request comprises a first sequence number;
- wherein each node of the cluster of nodes comprises a plurality of hardware units wherein each hardware unit of the plurality of hardware units is coupled to a particular memory and a particular cache and each particular hardware unit of the plurality of hardware units is configured as a cache controller of the particular memory and the particular cache;
- determining, by the first hardware unit, that no data message has been received by the first hardware unit from the home node in a specified time out period for the first request for particular data;
- based on the determining that no data message has been received, sending, by the first hardware unit on the requester node, a second request for the particular data to the home node, wherein the second request comprises a second sequence number;
- receiving, by the first hardware unit on the requester node, a first data message containing the particular data from the home node;
- sending, by the first hardware unit on the requester node, an acknowledgement message to the home node;
- storing at the requester node a plurality of entries, wherein each entry of the plurality of entries comprises a transaction identifier, sequence number, source node identifier destination node identifier, and cache line address; and
- storing within the plurality of entries based on the sending of the first request for particular data, by the first hardware unit, a first entry for the first request for particular data, wherein the first entry comprises a first transaction identifier, the first sequence number, a first source node identifier that identifies the requester node, a first destination node identifier that identifies the home node and a first cache line address that identifies the particular data.

12. The one or more non-transitory computer-readable storage media of claim 11, the sequences of instructions further comprising instructions, which when executed by the one or more processors, cause:
- storing a first cache line state of the particular data in a first directory on the requester node; and
- storing a second cache line state of the particular data in a second directory on the home node.

13. The one or more non-transitory computer-readable storage media of claim 12, the sequences of instructions further comprising instructions, which when executed by the one or more processors, cause:
- in response to receiving the data message at the requester node, the first hardware unit updating the first cache line state of the particular data on the requester node to a shared clean state; and
- in response to receiving the acknowledgement message at a second hardware unit on the home node, the second hardware unit updating the second cache line state of the particular data on the home node to a shared clean state.

14. The one or more non-transitory computer-readable storage media of claim 11, the sequences of instructions further comprising instructions, which when executed by the one or more processors, cause:
- storing within the plurality of entries, based on the sending of the second request for the particular data, by the first hardware unit, a second entry for the first request for particular data, wherein the second entry comprises the first transaction identifier, another sequence number, the first source node identifier that identifies the requester node, the first destination node identifier that identifies the home node, and the first cache line address.

15. The one or more non-transitory computer-readable storage media of claim 14, the sequences of instructions further comprising instructions, which when executed by the one or more processors, cause:
- in response to receiving the first data message containing the particular data from the home node, deleting the first entry and the second entry.

* * * * *

UNITED STATES PATENT AND TRADEMARK OFFICE
CERTIFICATE OF CORRECTION

PATENT NO. : 10,452,547 B2
APPLICATION NO. : 15/858787
DATED : October 22, 2019
INVENTOR(S) : Paul N. Loewenstein et al.

It is certified that error appears in the above-identified patent and that said Letters Patent is hereby corrected as shown below:

In the Drawings

Replace FIG. 5N with the attached replacement FIG. 5N enclosed herewith.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*

| In | Cur. state | | Out | | Next state | |
|---|---|---|---|---|---|---|
| | FSM | Dir. | Req | Slave(s) | FSM | Dir. |
| RTU (1) | Idle | E | Data | - | crtu5 | $E_R$ |
| | | $S_R, E_R$ | Ack | | | $E_R$ |
| | | $S_R+$ | - | CPI (6) | crtu3 | - |
| | | S | | | crtu4 | |
| | | I | | | crtu1 | |
| Data (2) | ctru1 | - | - | Ack | crtu2 | +H (5) |
| Ack (2) | | | Data | - | crtu5 | $E_R$ |
| Replay (3) | | | - | CPI (7) | crtu1 | - |
| Retry | | | | CPI (6) | | |
| Abandon | | | Data/P | - | crtu5 | $E_R/P$ |
| Ack (2) | ctru2 | - | Data | - | crtu5 | $E_R$ |
| Retry | | | - | CPI (6) | crtu4 | - |
| Abandon | | | Data/P | - | crtu5 | $E_R/P$ |
| Data (2) | ctru3 | - | - | Ack | crtu3 | - (4) |
| Ack (2,8) | | | | - | | -X |
| Ack (2,9) | | | Ack | | crtu5 | $E_R$ |
| Replay (3) | | | - | CPI (7) | crtu3 | - |
| Retry | | | | CPI (6) | | |
| Abandon | | | Nack | - | Idle | $E_R/P$ |
| Data (2) | ctru4 | - | - | Ack | crtu4 | - (4) |
| Ack (2,8) | | | | - | | -X |
| Ack (2,9) | | | Data | | crtu5 | $E_R$ |
| Replay (3) | | | - | CPI (7) | crtu4 | - |
| Retry | | | | CPI (6) | | |
| Abandon | | | Data/P | - | crtu5 | $E_R/P$ |
| Ack (1) | ctru5 | - | - | - | Idle | - |
| Nack (1) | | | | | | |
| Timeout | | | | | | |

RTU received at Home

Notes
1. From requesting node.
2. From slave node.
3. From interconnect, but appears to Home to originate from Slave.
4. Discard data.
5. Accept data.
6. Send CPI with new sequence number to all holders except requester.
7. Send CPI with existing sequence number to origin of Replay.
8. There are still more CPI Acks to be received.
9. There are no more CPI Acks to be received; the only importer other than the requester with a valid directory entry is the source of this Ack.

*FIG. 5N*